US012184726B2

(12) United States Patent
Liu

(10) Patent No.: US 12,184,726 B2
(45) Date of Patent: Dec. 31, 2024

(54) BLOCKCHAIN-BASED DATA PROCESSING METHOD AND APPARATUS, DEVICE, AND READABLE STORAGE MEDIUM

(71) Applicant: TENCENT TECHNOLOGY (SHENZHEN) COMPANY LIMITED, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/303,560

(22) Filed: Apr. 19, 2023

(65) Prior Publication Data

US 2023/0262126 A1 Aug. 17, 2023

Related U.S. Application Data

(63) Continuation of application No. PCT/CN2022/092177, filed on May 11, 2022.

(30) Foreign Application Priority Data

Jun. 2, 2021 (CN) .......................... 202110616371.2

(51) Int. Cl.
H04L 67/1097 (2022.01)
H04L 9/08 (2006.01)
H04L 9/32 (2006.01)

(52) U.S. Cl.
CPC ........ H04L 67/1097 (2013.01); H04L 9/0825 (2013.01); H04L 9/3247 (2013.01)

(58) Field of Classification Search
None
See application file for complete search history.

(56) References Cited

U.S. PATENT DOCUMENTS 10,848,549 B1 11/2020 Rizvi et al.
2016/0019125 A1 1/2016 Madduri et al.
(Continued)

FOREIGN PATENT DOCUMENTS

CN 109309723 A 2/2019
CN 110825349 A 2/2020
(Continued)

OTHER PUBLICATIONS

China National Intellectual Property Administration (CNIPA) Office Action 1 for 202110616371..2 Jul. 12, 2021 8 Pages (including translation).

(Continued)

Primary Examiner — Scott B Christensen
(74) Attorney, Agent, or Firm — ANOVA LAW GROUP PLLC

(57) ABSTRACT

A blockchain-based data processing method includes: starting to select a second consensus node set corresponding to a second consensus period when a height of a block generated in a first consensus period meets a consensus node set switching condition, and determining a height of a block generated when selecting the second consensus node set, as a first block height; generating a first block by adding set information corresponding to the second consensus node set to a block corresponding to the first block height, and broadcasting the first block in a blockchain network; acquiring a private key segment generation notification generated and transmitted by a consensus node in the second consensus node set, the private key segment generation notification carrying a notification signature; and determining a consensus permission of the consensus node in the second consensus node set for the second consensus period according to the notification signature.

20 Claims, 15 Drawing Sheets

(56) References Cited

U.S. PATENT DOCUMENTS

2019/0370806 A1* 12/2019 Wang .................. G06Q 20/405
2020/0213136 A1* 7/2020 Yang ..................... H04L 63/062

FOREIGN PATENT DOCUMENTS

| CN | 111444210 A | 7/2020 |
| CN | 111464356 A | 7/2020 |
| CN | 111865595 A | 10/2020 |
| CN | 112398956 A | 2/2021 |
| CN | 113067707 A | 7/2021 |
| CN | 113783699 A | 12/2021 |

OTHER PUBLICATIONS

The World Intellectual Property Organization (WIPO) International Search Report for PCT/CN2022/092177 Jul. 27, 2022 5 Pages (including translation).

* cited by examiner

BLOCKCHAIN-BASED DATA PROCESSING METHOD AND APPARATUS, DEVICE, AND READABLE STORAGE MEDIUM

CROSS-REFERENCES TO RELATED APPLICATIONS

This application is a continuation application of PCT Patent Application No. PCT/CN2022/092177, entitled "DATA PROCESSING METHOD AND APPARATUS BASED ON BLOCKCHAIN, AND DEVICE AND READABLE STORAGE MEDIUM" and filed on May 11, 2022, which claims priority to Chinese Patent Application No. 202110616371.2, entitled "BLOCKCHAIN-BASED DATA PROCESSING METHOD AND APPARATUS, DEVICE, AND READABLE STORAGE MEDIUM" and filed with the China National Intellectual Property Administration on Jun. 2, 2021, the entire contents of both of which are incorporated herein by reference.

FIELD OF THE TECHNOLOGY

The present disclosure relates to the field of Internet technologies, and in particular, to a blockchain-based data processing method and apparatus, a device, and a computer-readable storage medium.

BACKGROUND OF THE DISCLOSURE

With the rapid development of network technologies and the importance attached to data security by governments and enterprises, blockchains are widely used. Nodes in a blockchain network may include a consensus node and a synchronization node, where the consensus node participates in bookkeeping consensus, the synchronization node mainly performs service execution, does not participate in bookkeeping consensus, and synchronizes block data from the consensus node in an identity authentication manner.

A consensus node of a current blockchain performs data signature by using a public key infrastructure (PKI) system, that is, each consensus node generates a public and private key pair, protects the private key, and publicly discloses the public key. When consensus is reached on a block, the consensus node attaches its own private key signature data. However, a public and private key pair corresponding to each consensus node is only associated with the consensus node, and is the same all the time. Therefore, a lawbreaker may easily obtain the private key corresponding to the consensus node by using node information of the consensus node. In this case, security of a blockchain service cannot be ensured.

In addition, the consensus node and the synchronization node are not fixed, and the consensus node is in a term of office. Each time a term of office ends, a blockchain consensus node set (also referred to as a blockchain consensus committee) needs to re-select (or elect) a new consensus node from blockchain nodes and switch from a first blockchain consensus node set to a second blockchain consensus node set. In a process of acquiring consensus configuration information of a second consensus period from the second blockchain consensus node set and synchronizing a block, the second blockchain consensus node set cannot start to perform consensus processing on a new block, and thus the blockchain network suspends consensus processing on the new block, thereby reducing coherence and timeliness of a blockchain service.

SUMMARY

Embodiments of the present disclosure provide a blockchain-based data processing method, and apparatus, a device, and a computer-readable storage medium, which cannot only improve coherence and timeliness of a blockchain service, but also improve security of the blockchain service.

An aspect of the embodiments of the present disclosure provides a blockchain-based data processing method, performed by a computer device and including: starting to select a second consensus node set corresponding to a second consensus period when a height of a block generated in a first consensus period meets a consensus node set switching condition, and determining a height of a block generated when selecting the second consensus node set, as a first block height, a block corresponding to a maximum block height in the first consensus period being a previous block of a block corresponding to a minimum block height in the second consensus period; generating a first block by adding set information corresponding to the second consensus node set to a block corresponding to the first block height, and broadcasting the first block in a blockchain network, so that a consensus node in the second consensus node set generates, within a transition consensus time period according to the set information in the first block, a private key segment associated with the second consensus period, the transition consensus time period referring to duration consumed by a first consensus node set corresponding to the first consensus period to perform consensus processing on a block whose block height belongs to a transition block height interval, and all block heights included in the transition block height interval being greater than the first block height; acquiring a private key segment generation notification transmitted by the consensus node in the second consensus node set, the private key segment generation notification carrying a notification signature, and the notification signature being generated by the consensus node in the second consensus node set by generating and signing a notification according to the private key segment associated with the second consensus period; and determining a consensus permission of the consensus node in the second consensus node set for the second consensus period according to the notification signature.

An aspect of the embodiments of the present disclosure provides a blockchain-based data processing apparatus, including: a first determining module, configured to: start to select a second consensus node set corresponding to a second consensus period when a height of a block generated in a first consensus period meets a consensus node set switching condition, and determine a height of a block generated when selecting the second consensus node set, as a first block height, a block corresponding to a maximum block height in the first consensus period being a previous block of a block corresponding to a minimum block height in the second consensus period; a first generation module, configured to: generate a first block by adding set information corresponding to the second consensus node set to a block corresponding to the first block height, and broadcast the first block in a blockchain network, so that a consensus node in the second consensus node set generates, within a transition consensus time period according to the set information in the first block, a private key segment associated with the second consensus period, the transition consensus time period refers to duration consumed by a first consensus node set corresponding to the first consensus period to perform consensus processing on a block whose block height belongs to a transition block height interval, and all block heights included in the transition block height interval being greater than the first block height; a first acquiring module, configured to acquire a private key segment generation notification transmitted by the consensus node in the second consensus node set, the private key segment generation notification carrying a notification signature, and the notification signature being generated by the consensus node in the second consensus node set by generating and signing a notification according to the private key segment associated with the second consensus period; and a second determining module, configured to determine a consensus permission of the consensus node in the second consensus node set for the second consensus period according to the notification signature.

An aspect of the present disclosure provides a computer device, including: a processor, a memory, and a network interface; the processor being connected to the memory and the network interface, the network interface being configured to provide a data communication function, the memory being configured to store a computer program, and the processor being configured to invoke the computer program, so that the computer device performs the method in the embodiment of the present disclosure.

An aspect of the embodiments of the present disclosure provides a non-transitory computer-readable storage medium. The computer-readable storage medium stores a computer program. The computer program is adapted to be loaded and executed by a processor, to perform the method in the embodiment of the present disclosure.

BRIEF DESCRIPTION OF THE DRAWINGS

To describe technical solutions in embodiments of the present disclosure or the related art more clearly, the following briefly introduces the accompanying drawings required for describing the embodiments or the related art. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Figure 1:
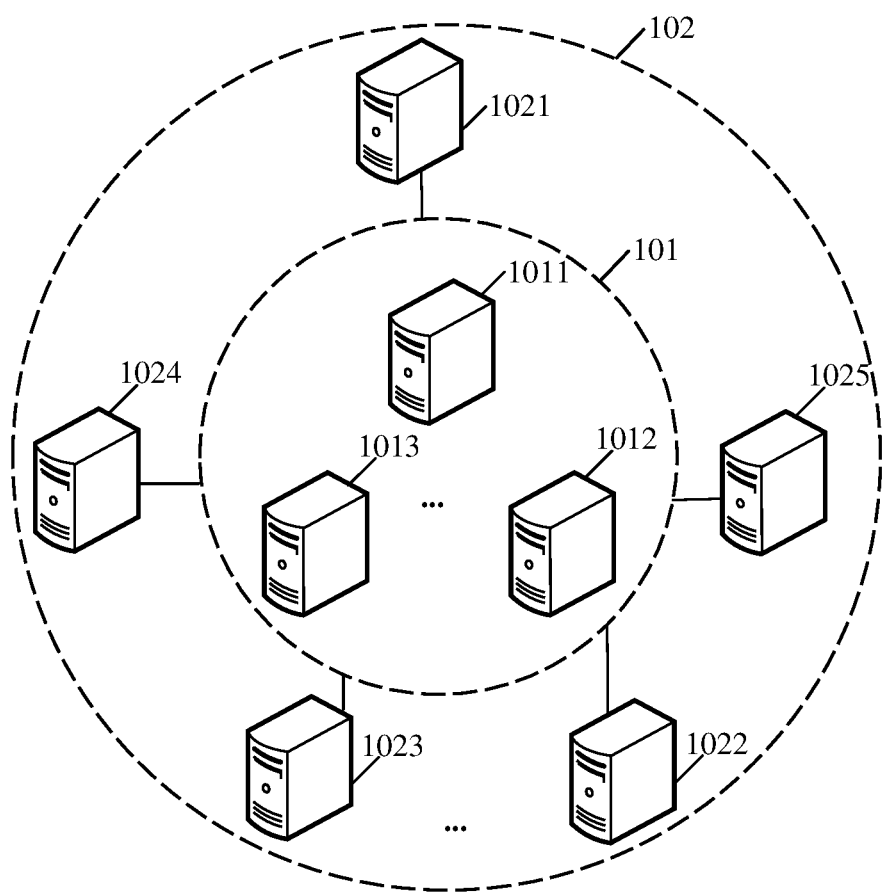
FIG. 1 is a schematic diagram of a system architecture according to an embodiment of the present disclosure.

The technical solutions in embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

For ease of understanding, some nouns are first briefly explained as follows:

1. Blockchain: In a narrow sense, the blockchain is a chained data structure that uses a block as a basic unit. In the block, a digital digest is used for checking a previously obtained transaction history, so as to meet a requirement of tamper prevention and scalability in a distributed accounting scenario. In a broad sense, the blockchain further refers to a distributed accounting technology implemented on behalf of a blockchain structure, including distributed consensus, privacy and security protection, point-to-point communication technology, network protocol, smart contract, and the like. The goal of the blockchain is to implement a distributed data record ledger in which only addition is allowed and deletion is not allowed. A basic structure of the ledger bottom layer is a linear linked list. The linked list is composed of "blocks" in series. In a subsequent block, a hash value of a previous block is recorded. Whether each block (and a transaction in the block) is valid can be checked quickly by calculating a hash value. If a node in a network proposes to add a new block, consensus acknowledgment needs to be reached on the block by using a consensus mechanism.

2. Block: A data packet that carries transaction data on a blockchain network, and is a data structure that is marked with a time stamp and a hash value corresponding to a previous block. A transaction in the block is verified and confirmed by using a network consensus mechanism. The block includes a block header and a block body, and the block header may record meta information of the current block, including data such as a current version number, a hash value corresponding to a previous block, a time stamp, a random number, and a hash value of a Merkle root. The block body may record detailed data generated within a period of time, including all transaction records or other information of the current block that is verified and generated in a process of creating the block, and may be understood as an expression form of a ledger.

3. Hash value: Also referred to as an information eigenvalue or an eigenvalue. The hash value is generated by converting input data of any length into a password by using a hash algorithm and performing fixed output, and original input data cannot be retrieved by decrypting the hash value. The hash value is a unidirectional encryption function. In a blockchain, each block (except the initial block) contains a hash value of a previous block, which is referred to as a parent block of the current block. In the blockchain technology, the hash value preserves authenticity of a record and view data and integrity of the blockchain as a whole.

4. Blockchain node: The blockchain network divides nodes into a consensus node (also referred to as a core node) and a synchronization node (including a data node and a light node). The consensus node is responsible for a network-wide consensus service of the blockchain. The synchronization node is responsible for synchronizing ledger information of the consensus node, that is, synchronizing latest block data. An internal structure of the consensus node or the synchronization node includes a network communication component, because the blockchain network is essentially a peer to peer (P2P) network and needs to communicate with another node in the blockchain network by using a P2P component. Resources and services in the blockchain network are distributed on each node. Information transmission and service implementation are directly performed between nodes, and no intermediate link or centralized server (third party) is needed.

5. Consensus mechanism: The consensus mechanism is a mathematical algorithm for establishing trust and acquiring rights and interests between different node devices in a blockchain system. In the blockchain system, by using a voting mechanism (that is, a consensus mechanism) between node devices, verification and confirmation of a transaction can be completed in a short time. For a transaction, if consensus can be reached by several node devices whose benefits are not associated with each other, it is considered that all node devices in the system can reach consensus on this.

6. Public key and private key: The public key and the private key are a key pair (that is, one public key and one private key) obtained by using an algorithm, the public key is a part disclosed in the key pair, and the private key is a part not disclosed. The public key is usually used for encrypting data, authenticating a digital signature, and the like. By using this algorithm, it can be ensured that an obtained key pair is unique. When the key pair is used, if one of the keys is used for encrypting a segment of data, decryption needs to be performed by using the other key. For example, data encrypted by using the public key needs to be decrypted by using the private key. If the private key is used for encrypting data, decryption needs to be performed by using the public key. Otherwise, decryption is not successful.

7. Distributed key generation (DKG) protocol: This protocol is an important part of a distributed encryption system. In the DKG protocol, multiple participants (node devices participating in consensus) cooperate to generate a global public key and respective private key segments according to a preset encryption system, and no trusted third party is needed. The global public key generated by the DKG protocol is outputted in an open form, and each private key segment is shared by a participant according to a secret sharing scheme. The shared private key segment may be used in a group-oriented cryptographic system, such as group signature or group decryption.

Referring to FIG. 1, FIG. 1 is a schematic diagram of a system architecture according to an embodiment of the present disclosure. As shown in FIG. 1, the system architecture may be a blockchain network, and the blockchain network may include a consensus network 101 and a synchronization network 102. A node in the synchronization network 102 may be referred to as a synchronization node. The synchronization node mainly performs service execution, does not participate in accounting consensus, and obtains block data from the consensus network 101 in an identity authentication manner. The consensus network 101 may also be referred to as a core network, a node in the consensus network 101 may be referred to as a consensus node, and the consensus node has full data. The consensus network 101 and the synchronization network 102 may be located in different network environments. Generally, the consensus network 101 is located in a private network, and the synchronization network 102 is located in a common network. The consensus network 101 and the synchronization network 102 interact by using a routing boundary.

Referring to FIG. 1 again, the consensus network 101 may include a consensus node 1011, a consensus node 1012, . . . , and a consensus node 1013. It may be understood that the consensus network 101 may include one or more consensus nodes, and a quantity of consensus nodes is not limited herein. The synchronization network 102 may include a synchronization node 1021, a synchronization node 1022, a synchronization node 1023, . . . , a synchronization node 1024, and a synchronization node 1025. It may be understood that the synchronization network 102 may include one or more synchronization nodes, and a quantity of synchronization nodes is not limited herein.

Each node (including the consensus node in the consensus network 101 and the synchronization node in the synchronization network 102) may receive, when operating normally, transaction data transmitted by a client, generate a block based on the received transaction data, and then perform block on-chain processing. To ensure data interworking between nodes, a data connection may exist between nodes, for example, a data connection exists between the consensus node 1011 and the consensus node 1012, a data connection exists between the consensus node 1011 and the consensus node 1013, and a data connection exists between the synchronization node 1021 and the synchronization node 1023.

Further, a data connection exists between the consensus network 101 and the synchronization network 102, for example, a data connection exists between the consensus node 1011 and the synchronization node 1022, and a data connection exists between the consensus node 1012 and the synchronization node 1023.

It may be understood that data or block transmission may be performed between nodes by using the foregoing data connection. The foregoing data connection between nodes may be based on a node identifier. Each node in the blockchain network has a node identifier corresponding to the node, and each node may store a node identifier of another node connected to the node, so that obtained data or a generated block is subsequently broadcast to the another node according to the node identifier of the another node. For example, the consensus node 1011 may maintain a node identifier list, and the node identifier list stores a node name and a node identifier of another node. As shown in Table 1:

TABLE 1

| Node name | Node identifier |
| --- | --- |
| Consensus node 1012 | 117.114.151.174 |
| Consensus node 1013 | 117.116.189.145 |
| ... | ... |
| Synchronization node 1021 | 117.114.151.183 |
| Synchronization node 1022 | 117.116.189.125 |
| Synchronization node 1023 | 119.250.485.362 |
| ... | ... |

The node identifier may be an Internet Protocol (IP) address and any other information that can be used for identifying a node in the blockchain network. In Table 1, only an IP address is used as an example for description.

Assuming that the node identifier of the consensus node 1011 is 117.116.156.425, the consensus node 1011 may transmit a data synchronization request to the synchronization node 1021 by using the node identifier 117.114.151.183, and the synchronization node 1021 may learn, by using the node identifier 117.116.156.425, that the data synchronization request is transmitted by the consensus node 1011. Similarly, the synchronization node 1023 may transmit transaction data A to the consensus node 1011 by using the node identifier 117.116.156.425, and the consensus node 1011 may learn, by using the node identifier 119.250.485.362, that the transaction data A is transmitted by the synchronization node 1023, and data transmission between other nodes is also the same. Therefore, details are not described again.

It may be understood that the foregoing data connection does not limit a connection manner, and the nodes may be directly or indirectly connected in a wired communication manner, may be directly or indirectly connected in a wireless communication manner, or may be connected in another connection manner, which is not limited in the present disclosure.

The consensus node 1011, the consensus node 1012, the consensus node 1013, the synchronization node 1021, the synchronization node 1022, the synchronization node 1023, the synchronization node 1024, and the synchronization node 1025 in FIG. 1 may include a mobile phone, a tablet computer, a notebook computer, a palmtop computer, an intelligent audio, a mobile Internet device (MID), a point of sales (POS) machine, a wearable device (such as a smart watch or a smart band), and the like.

It may be understood that the blockchain-based data processing method provided in this embodiment of the present disclosure may be performed by a computer device, and the computer device includes but is not limited to a terminal or a server. The server may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner, which is not limited in the present disclosure.

For ease of description, in the present disclosure, a block whose block height is X is named as a block X, and a block whose block height is X is described as a block height X, where X is a positive integer. For example, a block whose block height is 1 is named as a block 1, and a block whose block height is 1 is described as a block height 1. A block whose block height is 98 is named as a block 98, a block whose block height is 98 is described as a block height 98, and a block corresponding to another block height is also named in this way. Details are not described herein again.

It may be learned from FIG. 1 that the blockchain network includes a consensus network and a synchronization network, but a consensus node in the consensus network is not fixed, and a case of dynamic addition or deletion exists. A consensus process of the consensus network may be divided into consensus periods, where a fixed consensus node set participates in consensus of each consensus period, and other blockchain nodes are used as data synchronization nodes.

In the related art, whenever a period (that is, a term of office) ends, a blockchain consensus node set reselects a new consensus node from blockchain nodes. For example, a consensus node in a first term of blockchain consensus node set performs consensus processing on blocks respectively corresponding to a block height 1, a block height 2, ..., and a block height n in a first consensus period. When the block corresponding to the block height n is successfully on-chain, a second term of blockchain consensus node set is re-selected, and the first term of blockchain consensus node set is switched to the second term of blockchain consensus node set. In this case, a second term of blockchain consensus committee member needs to first acquire consensus configuration information for a second consensus period, for example, a consensus block range and a consensus node set, to complete a configuration operation, and further needs to complete block synchronization, so that a consensus node in the second term of blockchain consensus node set can normally perform consensus processing on blocks respectively corresponding to a block height n+1, a block height n+2, ..., and a block height 2n in the second consensus period.

However, according to this embodiment of the present disclosure, when a height of a block generated in a current consensus period meets a consensus node set switching condition, a consensus node set of a next consensus period is re-selected to participate in a consensus service of the next consensus period.

In addition, in the present disclosure, after the consensus node set of the next consensus period is selected, a consensus permission of the consensus node set of the previous consensus period is not immediately taken over by the new consensus node set, but a transition period is given to complete necessary preparation work in the transition period. For example, the new consensus node set needs to produce a key segment for the new consensus period by using a distributed key component.

Figure 2:
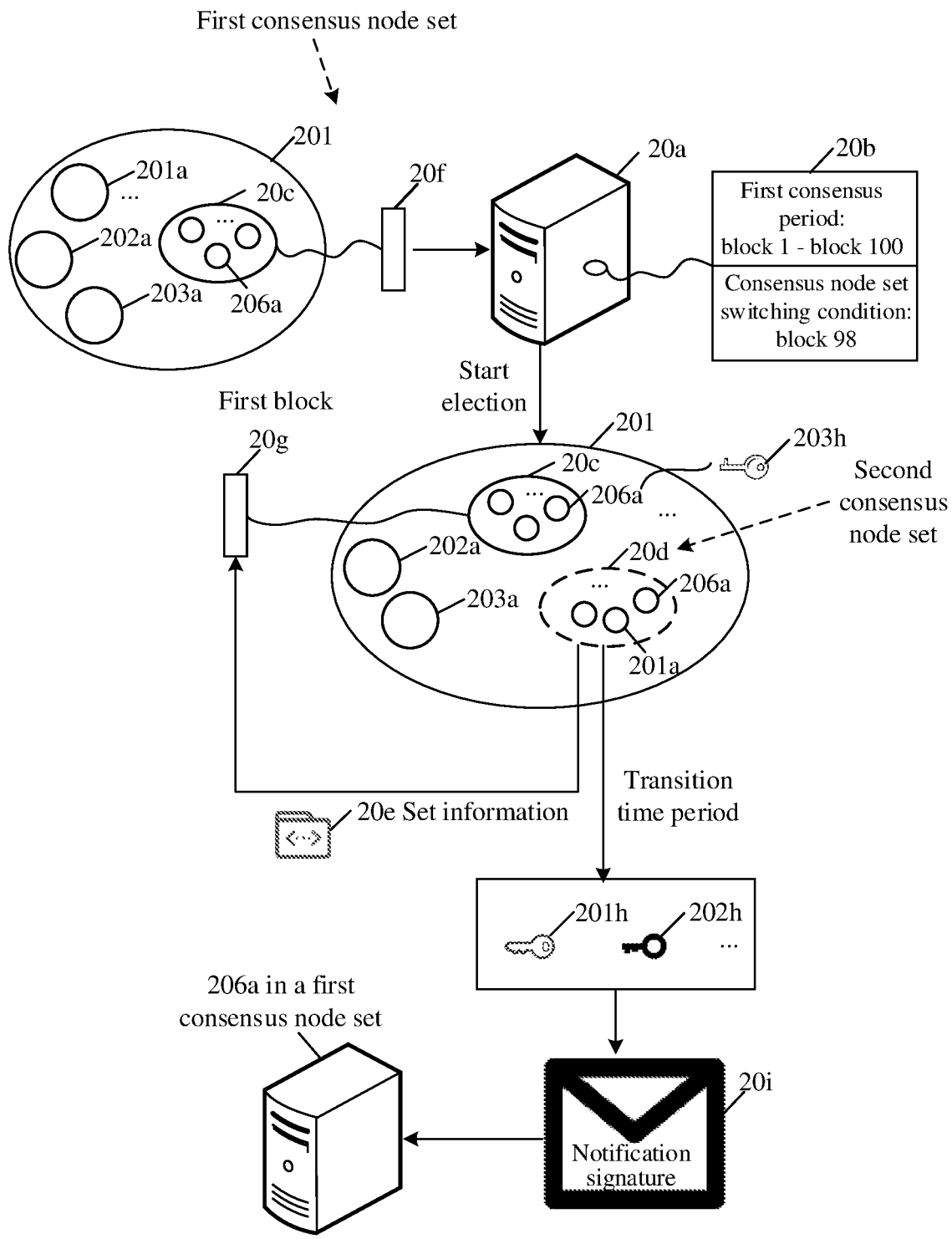
FIG. 2 is a schematic diagram of a scenario of blockchain-based data processing according to an embodiment of the present disclosure.

Referring to FIG. 2, FIG. 2 is a schematic diagram of a scenario of blockchain-based data processing according to an embodiment of the present disclosure. As shown in FIG. 2, a blockchain node set 201 includes a blockchain node 201a, a blockchain node 202a, and a blockchain node 203a, ..., and a blockchain node 206a. In a first consensus period (which may be understood as a current consensus period), the blockchain node 206a belongs to a first consensus node set 20c. The consensus node (also including the blockchain node 206a) in the first consensus node set 20c may be configured to perform on-chain processing on a block 1 to a block 100 in the first consensus period. The first consensus node set may be understood as a blockchain consensus node set corresponding to the first consensus period, and the blockchain consensus node set is a node that is in the blockchain and that is responsible for a consensus block, and is also referred to as a bookkeeper.

Referring to FIG. 2, the blockchain node 20a may be any blockchain node in the blockchain node set 201, the blockchain node 20a may include a periodic management component 20b, and the periodic management component 20b may include a consensus block range of the first consensus period, for example, the block 1 to the block 100 shown in FIG. 2. A consensus node set switching condition for the first consensus period may be included. As shown in the block 98 in FIG. 2, it may be understood that "the block 98" in the consensus node set switching condition may refer to a block that is generated by the first consensus node set 20c and whose block height is 98, or may refer to a block that is successfully on-chain with a block height of 98. A block status of the block 98 is not limited herein, and may be set according to an actual application scenario.

In this embodiment of the present disclosure, for example, a consensus node generates the block 98 (that is, the block 20f in FIG. 2) in the first consensus node set 20c. As shown in FIG. 2, in this case, a height of a block generated in the first consensus period (that is, the block height 98) meets the consensus node set switching condition. Therefore, the blockchain node 20a starts to select a consensus node corresponding to a second consensus period. A consensus block range of the second consensus period may include a block 101 to a block 200. The blockchain node 20a adds the selected consensus node for the second consensus period to a second consensus node set 20d. When the consensus node in the second consensus node set 20d is completely determined, the block that is being generated in the first consensus node set 20c (as shown in the block 20g in FIG. 2) is determined as a first block, and a block height corresponding to the first block is determined as a first block height (assuming that the first block is the block 99, the first block height is equal to a block height 99). It may be understood that the first block may further be a block that is being subject to consensus by the first consensus node set 20c or a block that is being on-chain by the first consensus node set 20c. Herein, a block status of the first block is not limited, and may be set according to an actual application scenario.

A blocking node in the first consensus node set 20c may add set information 20e corresponding to the second consensus node set 20d to a block header of the first block (that is, the block 20g in FIG. 2). When the first block passes consensus, the first block is broadcast to a synchronization network.

Different from the previous method, in this embodiment of the present disclosure, a transition block height interval is created at a change portion between the first consensus period and the second consensus period. The transition block height interval may be a fixed interval. For example, the blockchain node 20a first acquires a quantity of transition blocks. In this embodiment of the present disclosure, that the quantity of transition blocks is 10 is used as an example for description. With reference to the first block height (for example, the block height 99) and the quantity of transition blocks (10), the blockchain node 20a may determine that the transition blocks are the block 100, the block 101, the block 102, . . . , and the block 109. The block 100 is a block in the first consensus period, and the block 101, the block 102, . . . , and the block 109 are blocks in the second consensus period.

The consensus node (including the blockchain node 206a) in the first consensus node set 20c performs consensus on the block 100, and when the consensus is passed, the block 100 is on-chain. In this case, the blockchain consensus node set is not switched from the first consensus node set 20c to the second consensus node set 20d, that is, consensus is still performed by the consensus node in the first consensus node set 20c on the block 101, the block 102, . . . , and the block 109 in the second consensus period. When the first consensus node set 20c performs consensus processing on the transition blocks (e.g., the block 100, the block 101, the block 102, . . . , and the block 109), that is, in the transition time period, the consensus node (including the blockchain node 201a and the blockchain node 206a) in the second consensus node set 20d generates, according to set information 20e in the first block (that is, the block 20g in FIG. 2), a private key segment associated with the second consensus period, for example, a private key segment 201h, a private key segment 202h, . . . shown in FIG. 2. When consensus by the first consensus node set 20c for the block 109 is passed, the blockchain consensus node set is switched from the first consensus node set 20c to the second consensus node set 20d.

It may be understood that a total quantity of private key segments associated with the second consensus period is equal to a total quantity of consensus nodes in the second consensus node set 20d.

In some embodiments, the transition block height interval may not be a fixed interval, and is determined according to the first block height. For example, the blockchain node 20a determines a transition start block based on the first block (that is, the block 20g in FIG. 2), for example, the block 20g is the block 99, and the transition start block is the block 100. When the consensus node in the second consensus node set 20d generates a private key segment of its own, for example, the blockchain node 201a in the second consensus node set 20d generates a private key segment 201h of its own, and the blockchain node 206a in the second consensus node set 20d generates a private key segment 202h of its own. Clearly, the private key segment of the blockchain node 206a in the first consensus node set 20c for the first consensus period is the private key segment 203h, and is different from the private key segment 202h of the blockchain node 206a for the second consensus period. Each consensus node in the second consensus node set 20d may generate a notification by using a notification form, for example, the private key segment generation notification 20i shown in FIG. 2, and obtain a notification signature by using a signature of the private key segment associated with the second consensus period for the private key segment generation notification 20i. For example, the blockchain node 206a generates and signs a private key segment generation notification of the blockchain node 206a by using the private key segment 202h, to obtain a notification signature for the blockchain node 206a. Each consensus node in the second consensus node set 20d carries a private key segment of a notification signature, generates a notification 20i, and broadcasts the notification 20i to the first consensus node set 20c, for example, the blockchain node 206a in the first consensus node set 20c shown in FIG. 2 notifies the first consensus node set 20c that the key segment of the consensus node in the second consensus node set 20d has been generated.

Subsequently, when the consensus node (including the blockchain node 206a) in the first consensus node set 20c verifies the notification signature, and the verification succeeds, the block being processed by the first consensus node set 20c may be a transition end block, and the transition time period is a time period from consensus on a transition start block (for example, the block 100 in the foregoing example)

to consensus on the transition end block. For example, the blockchain system may set the quantity of transition blocks to be equal to 10, so that default transition blocks of the blockchain system are the block 100, the block 101, the block 102, . . . , and the block 109, but a block (for example, the block 103) subject to consensus by the first consensus node set 20c includes a notification signature transmitted by the consensus node in the second consensus node set 20d, and consensus on the consensus block 103 is passed. Therefore, the blockchain consensus node set may be switched from the first consensus node set 20c to the second consensus node set 20d, that is, the first consensus node set 20c may exit the blockchain consensus node set, so that the consensus node in the second consensus node set 20d joins the consensus block consensus node set, so as to have a consensus permission to a block in the second consensus period. Subsequently, the consensus node in the second consensus node set 20d performs a consensus service on the block in the second consensus period starting from the block 104.

In conclusion, during the transition time period, the consensus node in the second consensus node set 20d generates a private key segment associated with the second consensus period. Therefore, when the blockchain consensus node set is switched from the first consensus node set 20c to the second consensus node set 20d, it is not necessary to wait for the second consensus node set 20d to generate a private key segment associated with the second consensus period, so that the consensus node in the second consensus node set 20d can have a consensus permission in real time.

It may be learned from the foregoing that this embodiment of the present disclosure provides a method for switching a blockchain consensus node set. In this method, it can be ensured that a newly selected consensus node set (that is, the second consensus node set 20d in the foregoing) can smoothly take over a bookkeeping permission of the blockchain network, so that an old consensus node set (that is, the first consensus node set 20c in the foregoing) smoothly exits the bookkeeping permission of the blockchain network, thereby improving continuity and timeliness of the blockchain service.

In addition, a private key segment of each consensus node is generated according to set information corresponding to the consensus node set. In addition, because the consensus node set has a periodic characteristic (for example, the private key segment 203h of the blockchain node 206a in FIG. 2 for the first consensus period is not equal to the private key segment 202h of the blockchain node 206a for the second consensus period), the private key segment generated according to the set information is also periodic, and is not fixed, so that a security risk brought by private key leakage are avoided, thereby improving security of the blockchain service.

Figure 3:
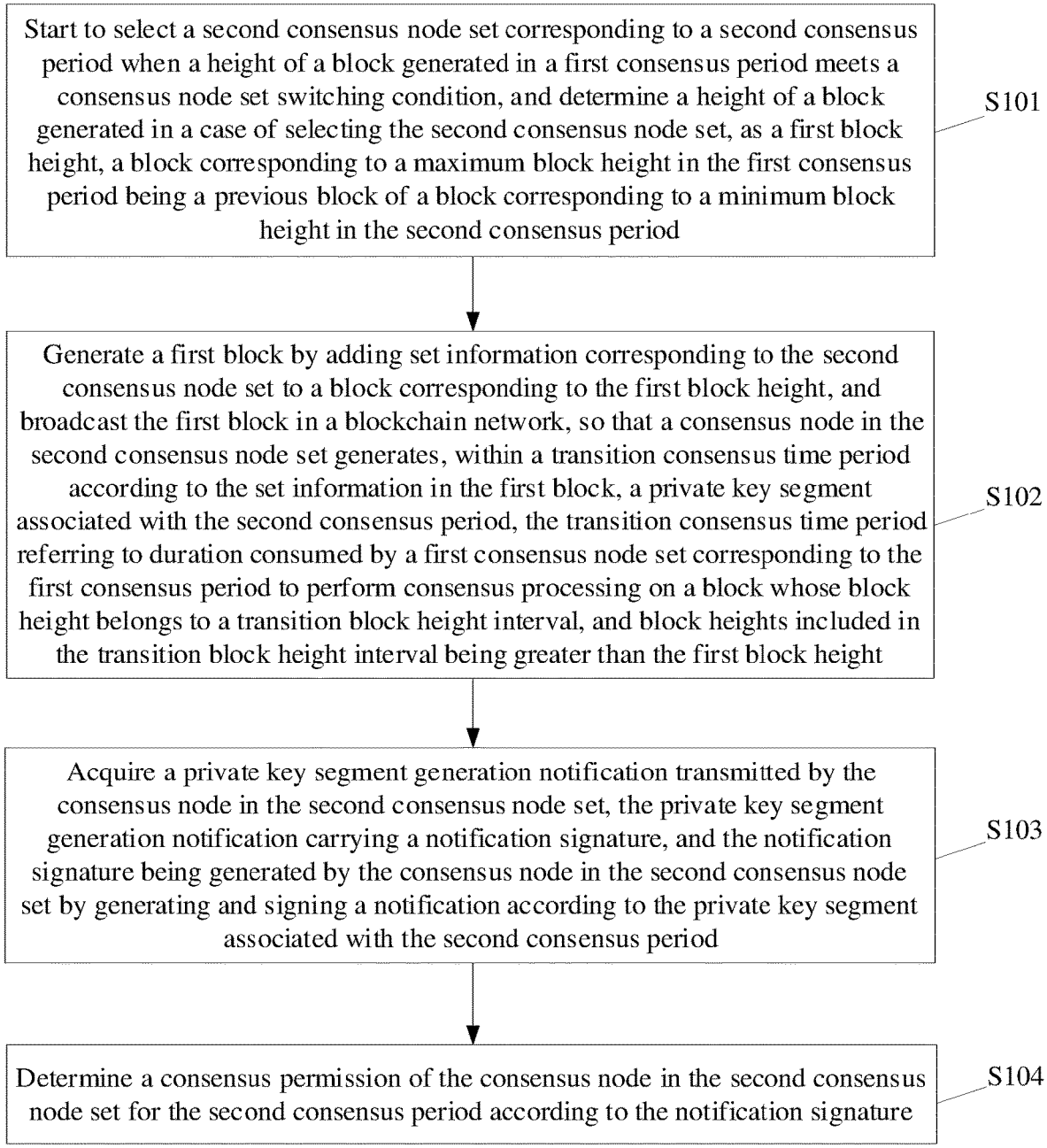
FIG. 3 is a schematic flowchart of a blockchain-based data processing method according to an embodiment of the present disclosure.

Further, referring to FIG. 3, FIG. 3 is a schematic flowchart of a blockchain-based data processing method according to an embodiment of the present disclosure. The blockchain-based data processing method may be performed by a computer device. The computer device may include any one consensus node in a first consensus node set, or may include any one consensus node in a second consensus node set, or may include any one consensus node in the first consensus node set and any one consensus node in the second consensus node set. As shown in FIG. 3, the blockchain-based data processing process may include the following steps:

Step S101: Start to select a second consensus node set corresponding to a second consensus period when a height of a block generated in a first consensus period meets a consensus node set switching condition, and determine a height of a block generated when selecting the second consensus node set, as a first block height, a block corresponding to a maximum block height in the first consensus period being a previous block of a block corresponding to a minimum block height in the second consensus period.

Specifically, the maximum block height that has been generated in the first consensus period is acquired, a consensus node set switching condition for the first consensus period is acquired, and the maximum block height attempts to match the consensus node set switching condition; if the maximum block height matches the consensus node set switching condition, an index number for the second consensus period is allocated to each blockchain node in a blockchain node set, where the index number includes a consensus index number; and a blockchain node with the consensus index number is added to the second consensus node set corresponding to the second consensus period.

Figure 4:
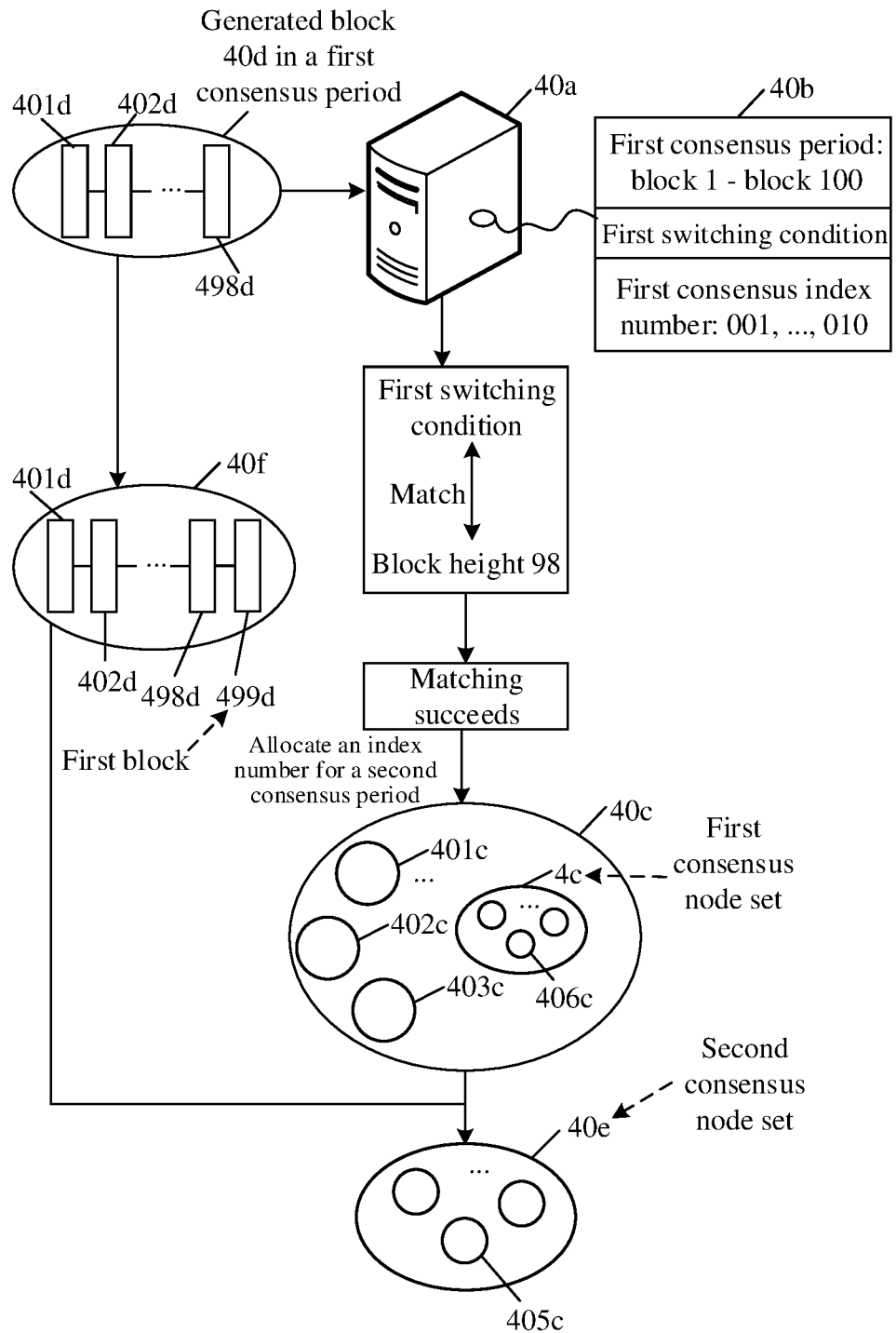
FIG. 4 is a schematic diagram of a scenario of blockchain-based data processing according to an embodiment of the present disclosure.

Referring to FIG. 4 together, FIG. 4 is a schematic diagram of a scenario of blockchain-based data processing according to an embodiment of the present disclosure. As shown in FIG. 4, a block 40d that has been generated in a current first consensus period may include a block 1 (i.e., a block 401d in FIG. 4), a block 2 (i.e., a block 402d in FIG. 4), and a block 98 (that is, a block 498d in FIG. 4), that is, currently a maximum block height is a block height 98 corresponding to the block 98, and the block height 98 is the foregoing maximum block height. A blockchain node set 40c may include a blockchain node 401c, a blockchain node 402c, a blockchain node 403c, . . . , and a blockchain node 406c (which is a consensus node in the first consensus node set 4c) and another consensus node in the first consensus node set 4c.

The blockchain node 40a may be any blockchain node in the blockchain node set 40c, the blockchain node 40a may include a periodic management component 40b, and as shown in FIG. 4, the periodic management component 40b may include a consensus block range of the first consensus period, for example, the block 1 to the block 100 shown in FIG. 4. The consensus node set switching condition for the first consensus period may be included (which may also be referred to as a first switching condition in FIG. 4). For details about the consensus node set switching condition in the foregoing embodiment corresponding to FIG. 2, details are not described herein again.

The periodic management component 40b may include a first consensus index number for the first consensus period, where the index number described in the present disclosure is a node index identifier that is different from a node identifier of a blockchain node itself (for example, the node identifier shown in Table 1 in the foregoing). The first consensus index number is used for representing an index number of a consensus node (including the blockchain node 406c) in the first consensus node set 4c, as shown in FIG. 4, the first consensus index number may include an index number 001, . . . , and an index number 010, where an index number of the blockchain node 406c is the index number 001. It may be understood that index numbers of the same blockchain node may change in different consensus periods. Therefore, consensus nodes corresponding to the same index number may be different in different consensus periods.

The periodic management component 40b may verify whether a local node (that is, the blockchain node 40a) is selected as a node in a next-term blockchain consensus node set, and if so, is added to a second consensus node set 40e. The periodic management component 40b may also verify whether a given node is a block proposal node, that is, a blocking node; and whether it has a function of signing a consensus message. In this embodiment of the present disclosure, the periodic management component 40b may maintain a blockchain consensus node set transition period. The transition period is indicated by using consecutive blocks, for example, after a new blockchain consensus node set (for example, the second consensus node set 40e) is selected, a previous-term blockchain consensus node set (for example, the first consensus node set 4c) continues to perform consensus processing on 10 blocks, and then the new blockchain consensus node set takes charge of bookkeeping. In this case, the previous-term blockchain consensus node set exits bookkeeping, and the 10 blocks are transition blocks in the transition period.

Referring to FIG. 4, the blockchain node 40a acquires a consensus node set switching condition (that is, a first switching condition) for the first consensus period from the periodic management component 40b, and then attempts to match a maximum block height (that is, the block height of the block 498d in FIG. 2, assuming a block height of 98) with the consensus node set switching condition. If the first switching condition is a block height 99, matching between the maximum block height and the first switching condition fails, and the blockchain node 40a waits for generation of a next block. If the first switching condition is the block height 98, the maximum block height matches the first switching condition successfully. As shown in FIG. 4, the blockchain node 40a allocates an index number for the second consensus period to each blockchain node in the blockchain node set 40c. For the second consensus period, it is assumed that an index number of the blockchain node 405c is the index number 001, and an index number of the blockchain node 406c is the index number 020. Assuming that the second consensus index number (i.e., the consensus index number for the second consensus period) includes the index number 001 and does not include the index number 020, the blockchain node 405c will be added to the second consensus node set 40e and the blockchain node 406c will not be added to the second consensus node set 40e, as shown in FIG. 4.

Referring to FIG. 4, the blockchain node 40a determines the second consensus node set 40e when the generated block 40f in the first consensus period generates the block 99 (which is equivalent to the block 499d in FIG. 4). Therefore, the block height 99 is determined as the first block height, and the block 499d is the first block, which is equivalent to the block 20g in FIG. 2.

Step S102: Generate a first block by adding set information corresponding to the second consensus node set to a block corresponding to the first block height, and broadcast the first block in a blockchain network, so that a consensus node in the second consensus node set generates, within a transition consensus time period according to the set information in the first block, a private key segment associated with the second consensus period, the transition consensus time period referring to duration consumed by a first consensus node set corresponding to the first consensus period to perform consensus processing on a block whose block height belongs to a transition block height interval, and all block heights included in the transition block height interval being greater than the first block height.

Specifically, the set information in the first block is acquired when the consensus node belongs to the second consensus node set, and a secret integer associated with the set information is generated by using a distributed key component; a target local public key is generated according to the secret integer; and at least two secret shares are generated according to the secret integer, a total quantity of the at least two secret shares being the same as the total quantity of consensus nodes in the second consensus node set. If the consensus node in the second consensus node set includes a consensus node $G_c$, c is a positive integer, c is less than or equal to the total quantity of nodes, and the at least two secret shares include a secret share $M_c$; the target local public key and the secret share $M_c$ are transmitted to the consensus node $G_c$, and acquiring a local public key $U_c$ and a secret share $E_c$ that are transmitted by the consensus node $G_c$, both the local public key $U_c$ and the secret share $E_c$ being associated with a secret integer corresponding to the consensus node $G_c$; validity verification is performed on the secret share $E_c$, and a validity verification result is broadcast to the consensus node in the second consensus node set; and a second target private key segment is generated according to the secret share $E_c$ and the secret share $M_c$, and a global public key associated with the second consensus node set is generated according to the target local public key and the local public key $U_c$.

Figure 5:
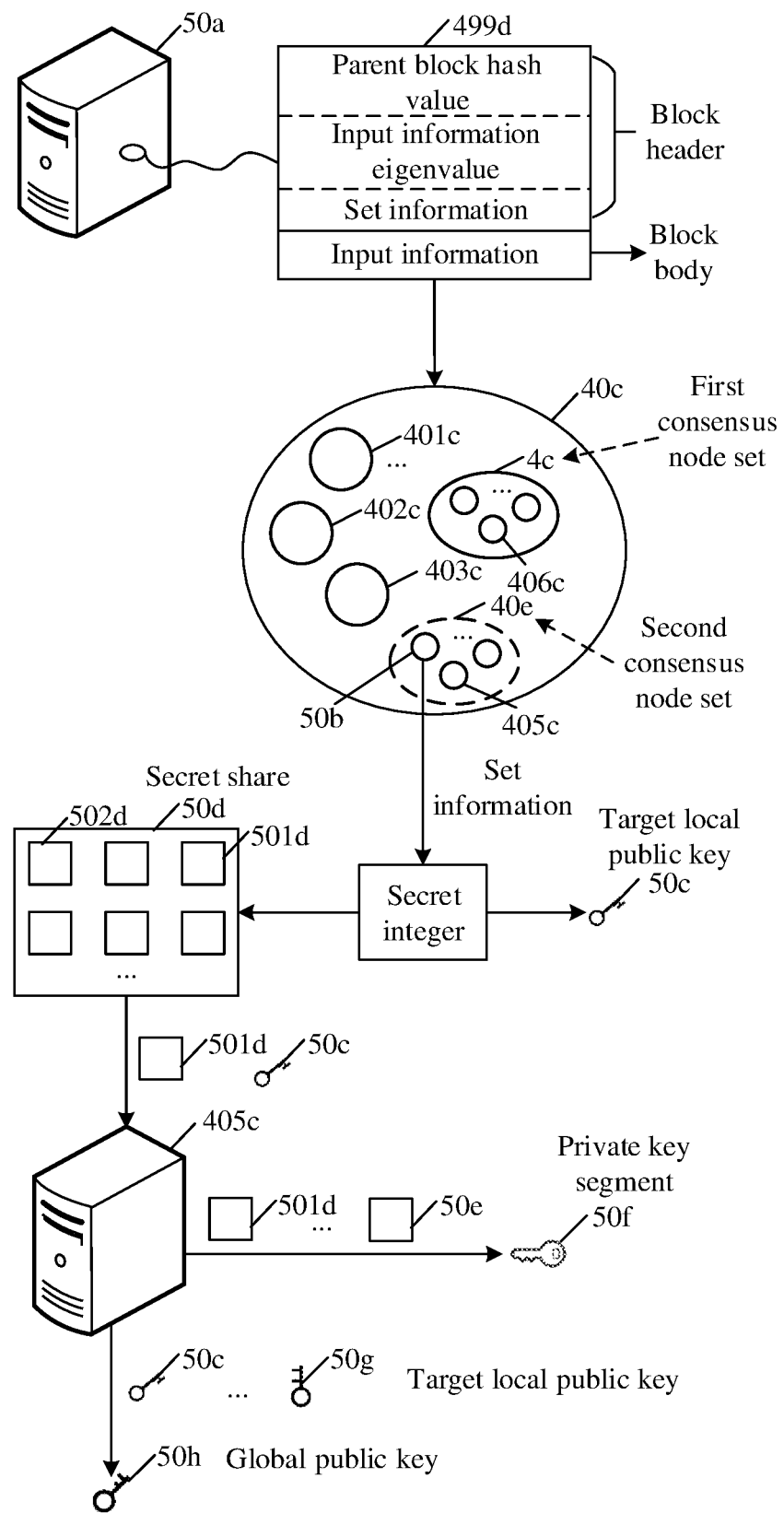
FIG. 5 is a schematic diagram of a scenario of blockchain-based data processing according to an embodiment of the present disclosure.

Referring to FIG. 5 together, FIG. 5 is a schematic diagram of a scenario of blockchain-based data processing according to an embodiment of the present disclosure. As shown in FIG. 5, a blockchain node set 40c may include a blockchain node 401c, a blockchain node 402c, a blockchain node 403c, . . . , and a blockchain node 406c (which is a consensus node in a first consensus node set 4c), another consensus node in the first consensus node set 4c, a blockchain node 50b (which is a consensus node in a second consensus node set 40e), and another consensus node (which includes the blockchain node 405c) in the second consensus node set 40e, where the blockchain node 50a in FIG. 5 may be any consensus node in the first consensus node set 4c, and the blockchain node 50a is a blocking node and used for generating a block 499d. The block 499d is equivalent to the block 499d in FIG. 4, that is, a corresponding block (that is, a first block) when the second consensus node set 40e is selected. The block 499d includes a block header and a block body, the block header may store an input information eigenvalue of a current block, a block header eigenvalue of a parent block (equivalent to a parent block hash value in FIG. 5), a version number, a time stamp, a difficulty value, and the like. Input information is stored in the block body. According to this embodiment of the present disclosure, set information corresponding to the second consensus node set 40e is also stored in the block header in the block 499d. The blockchain node 50a then broadcasts the block 499d (i.e., the first block described above) in a blockchain network.

In this embodiment of the present disclosure, that the blockchain node 50b is any consensus node in the second consensus node set 40e is used as an example. When the blockchain node 50b obtains the block 499d in a transition time period, aggregate signature carried in the block 499d is verified by using a global public key associated with the first consensus node set 4c. When a signature verification result is a signature verification success result, a private key segment associated with the second consensus period is generated according to the set information in the block 499d. The aggregate signature carried in the block 499d is generated according to a signature share respectively corresponding to a consensus node in the first consensus node set 4c, that is, the consensus node in the first consensus node set 4c separately signs, by using its private key segment associated with the first consensus period, the block 499d to obtain its signature share, and then aggregation processing is performed on the signature share respectively corresponding to the consensus node in the first consensus node set 4c to obtain the aggregate signature carried in the block 499d.

It may be understood that the blockchain node 50a and the blockchain node 50b may not be the same blockchain node, that is, the blockchain node 50a is a consensus node in the first consensus node set 4c, but is not a consensus node in the second consensus node set 40e. In some embodiments, the blockchain node 50a and the blockchain node 50b may be the same blockchain node. In this case, the blockchain node 50a is not only a consensus node in the first consensus node set 4c, but also a consensus node in the second consensus node set 40e.

It can be learned from the foregoing that when a consensus node in the consensus network dynamically joins and exits, the consensus node set of the consensus network also changes, that is, the first consensus node set is not equivalent to the second consensus node set. Therefore, for a blockchain node that is located in both the first consensus node set and the second consensus node set, its private key segment associated with the first consensus node set is different from its private key segment associated with the second consensus node set. For example, the private key segment 203h of the blockchain node 206a in the example shown in FIG. 2 associated with the first consensus node set 20c is different from the private key segment 202h of the blockchain node 206a associated with the second consensus node set 20d, and therefore the distributed key component recalculates the private key segment according to the new consensus node set information.

During the blockchain consensus node set transition period, an old consensus node set (e.g., the first consensus node set 4c in FIG. 5) continues to have a consensus and block-producing permission, and set information corresponding to a newly selected consensus node set (e.g., the second consensus node set 40e in) is appended to data of a block being processed. After the new consensus node set (that is, the second consensus node set 40e) is synchronized to the block (that is, the first block, which is equivalent to the block 499d in FIG. 5), the set information corresponding to the new consensus node set is notified to the distributed key component. After receiving the set information, the distributed key component starts to run the DKG protocol to calculate respective key segments.

In this embodiment of the present disclosure, a distributed key component that does not require approval from trusted party is first designed. The distributed key component can ensure security of a private key segment of a participant in a consensus network and validity of a global public key used for verifying an aggregate signature. When the consensus node of the consensus network is known, for example, the first consensus node set 4c and the second consensus node set 40e, the distributed key component serves as a participant, and a process of generating the private key segment is as follows.

1. Each consensus node in a consensus network has a consensus module component and a distributed key component. The consensus module component of each consensus node registers an event with the distributed key component of the consensus node, and the event is used for monitoring a private key segment generation status of the consensus node. To facilitate description and understanding of a private key segment generated by a consensus node, in this embodiment of the present disclosure, a consensus node (for example, the blockchain node 50b and the blockchain node 405c in FIG. 5) in the second consensus node set 40e is used as an example for description. For a process of generating a private key segment by another consensus node, refer to the following process.

Figure 6:
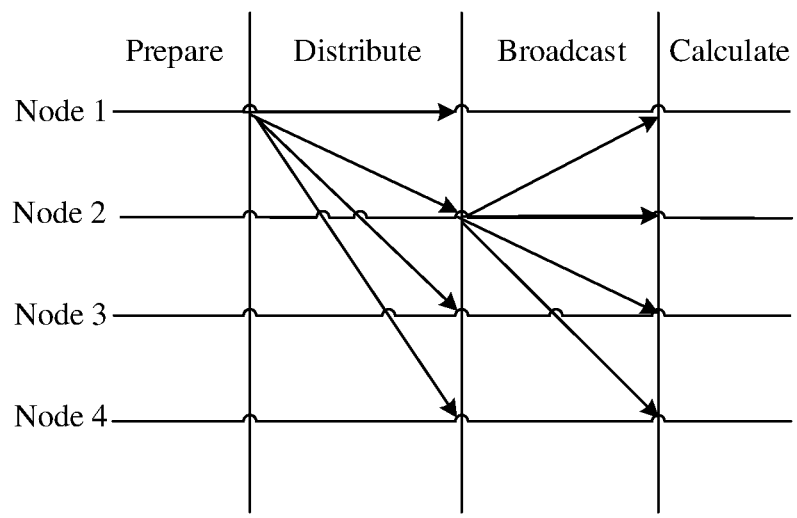
FIG. 6 is a schematic flowchart of a blockchain-based data processing method according to an embodiment of the present disclosure.

2. A distributed key component of the blockchain node 50b (the blockchain node 50b herein specifically refers to any consensus node in the second consensus node set 40e, and has a consensus permission and a block-producing permission) randomly generates a secret integer belonging to the blockchain node 50b, and then shares the secret integer with the consensus network according to the DKG protocol. For this process, references may be made to FIG. 6 together. FIG. 6 is a schematic flowchart of a blockchain-based data processing method according to an embodiment of the present disclosure. A node 1, a node 2, a node 3, and a node 4 in FIG. 6 are all consensus nodes in the second consensus node set 40e. It may be understood that each consensus node in the second consensus node set 40e performs the following process. For the sake of beauty and visibility of FIG. 6 in this embodiment of the present disclosure, only the node 1 represents the blockchain node 50b, and the node 2 represents a blockchain node 405c. As shown in FIG. 6, the method may include a preparation stage, a distribution stage, a broadcast stage, and a calculation stage. Functions of each stage are as follows:

a. Preparation stage: On one hand, the blockchain node 50b generates a target local public key 50c according to the secret integer. On the other hand, according to a verifiable secret sharing solution, the blockchain node 50b calculates, by using the secret integer of the blockchain node 50b, a secret share 50d that is to be shared with the consensus node. As shown in FIG. 5, the secret share 50d may include a secret share 501d, . . . , and a secret share 502d, a total quantity of secret shares 50d is equal to a total quantity of consensus nodes in the consensus network. This embodiment of the present disclosure sets no limitation on the foregoing verifiable secret sharing solution, and may be any solution, for example, a non-interactive verifiable secret sharing solution (Pedersen-Verifiable Secret Sharing, Pedersen-VSS) that is secure in information theory and that is proposed by Pedersen and a Feldman-Verifiable Secret Sharing (Feldman-VSS) solution that is proposed by Feldman.

b. Distribution stage: The blockchain node 50b distributes the secret share calculated in the preparation stage and the target local public key 50c to the corresponding consensus node, for example, distributes the secret share 502d to itself, and distributes the secret share 501d to the blockchain node 405c (the blockchain node 405c herein refers specifically to any consensus node in the second consensus node set 40e, and has a consensus permission and a block-producing permission).

c. Broadcast stage: After each consensus node receives a secret share distributed by another consensus node and a target local public key corresponding to the consensus node, for example, after the blockchain node 405c obtains the secret share 501d distributed by the blockchain node 50b and the target local public key 50c, . . . , the secret share 50e distributed by itself and the target local public key 50g, based on the Pedersen-VSS solution, the blockchain node 405c separately verifies validity of the obtained secret shares, and then broadcasts a verification result to another consensus node, such as the blockchain node 50b, in the second consensus node set 40e.

d. Calculation stage: On one hand, according to the Pedersen-VSS solution, the blockchain node 405c calculates the private key segment held by itself such as the private key segment 50f in the example of FIG. 5 by using secret shares (e.g., the secret shares 501d and 50e in the example of FIG. 5) distributed by all consensus nodes to itself as inputs. On the other hand, the blockchain node 405c calculates its global public key 50h by using target local public keys (for example, the target local public key 50c and the target local public key 50g that are shown in FIG. 5) obtained by the blockchain node 405c as inputs. A global public key corresponding to each consensus node in the second consensus node set 40e is the same.

3. After the distributed key component of the blockchain node 405c finds that its private key segment has been generated, the distributed key component transmits a notification signal to the event registered with the consensus module component, to notify that the private key segment is ready.

4. After receiving the notification, the consensus module component acquires the generated private key segment and uses the private key segment as a subsequent consensus voting signature. In addition, the consensus module component may enable a consensus permission.

Step S103: Acquire a private key segment generation notification transmitted by the consensus node in the second consensus node set, the private key segment generation notification carrying a notification signature, and the notification signature being generated by the consensus node in the second consensus node set by generating and signing a notification according to the private key segment associated with the second consensus period.

Specifically, after calculating its own key segment, each consensus node in the second consensus node set signs it by using a notification (that is, a private key segment generation notification), that is, generates a notification for one private key segment by using the private key segment, and signs the notification, and then broadcasts the private key segment generation notification that carries the notification signature to the consensus node in the first consensus node set, that is, notifies the first consensus node set that its key segment has been generated.

Figure 7:
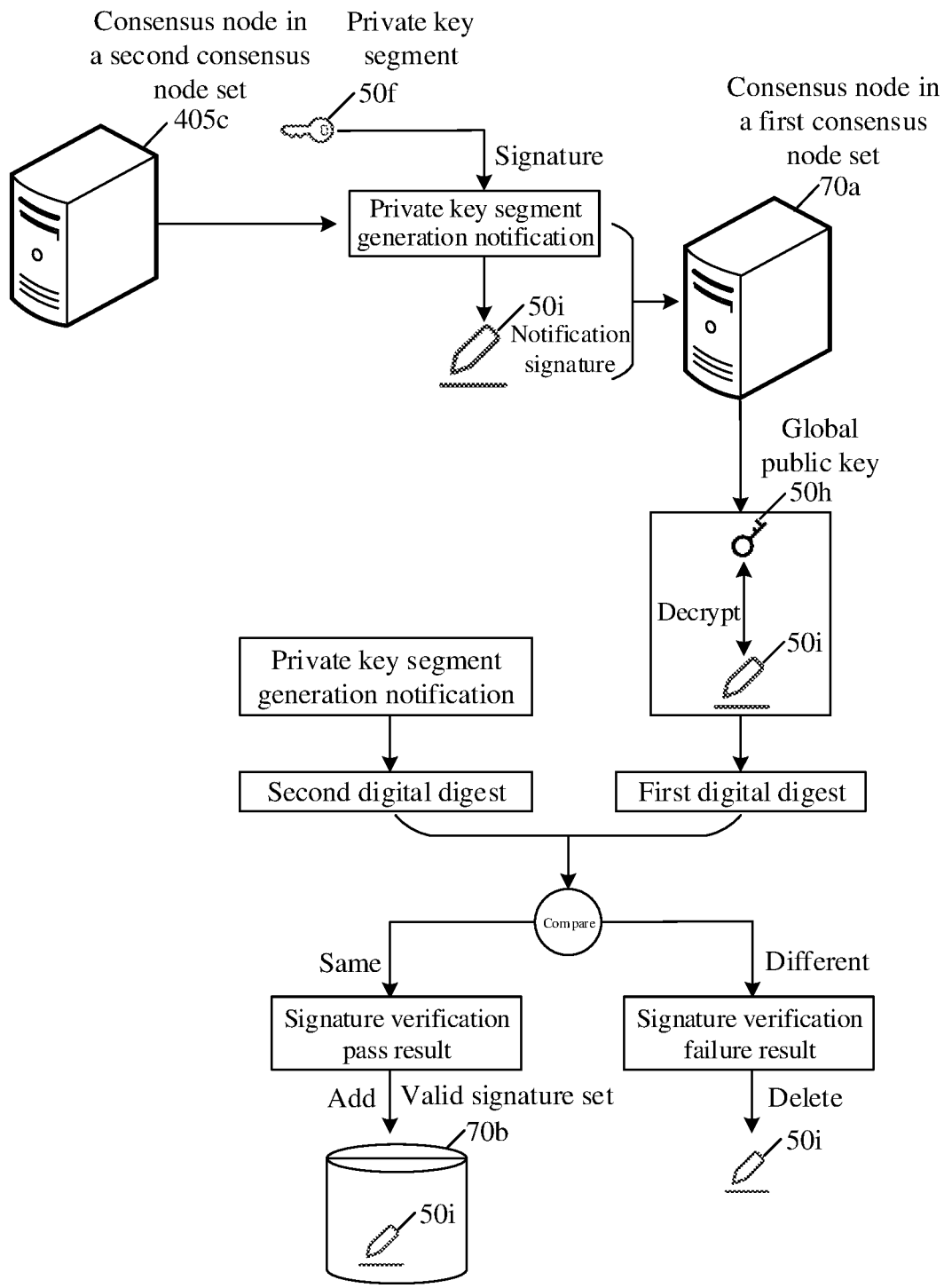
FIG. 7 is a schematic diagram of a scenario of blockchain-based data processing according to an embodiment of the present disclosure.

Referring to FIG. 7 together, FIG. 7 is a schematic diagram of a scenario of blockchain-based data processing according to an embodiment of the present disclosure. As shown in FIG. 7, a consensus node in a second consensus node set (a blockchain node 405c shown in FIG. 7) first generates a private key segment generation notification, then signs the private key segment generation notification by using its private key segment 50f to obtain a notification signature 50i, and then broadcasts the private key segment generation notification that carries the notification signature 50i to a consensus node in a first consensus node set, for example, a blockchain node 70a shown in FIG. 7.

Step S104: Determine a consensus permission of the consensus node in the second consensus node set for the second consensus period according to the notification signature.

Specifically, the second consensus node set includes a consensus node $G_a$, a is a positive integer, and a is less than or equal to a total quantity of consensus nodes in the second consensus node set, and the notification signature includes a notification signature $T_a$ for the consensus node $G_a$; and verification is performed on the notification signature $T_a$ by using a global public key associated with the second consensus node set, to obtain a first signature verification result $J_a$, the first signature verification result $J_a$ including a signature verification failure result or a signature verification pass result; the notification signature $T_a$ is deleted when the first signature verification result $J_a$ is the signature verification failure result; the notification signature $T_a$ is added to a valid signature set when the first signature verification result $J_a$ is the signature verification pass result; and the consensus permission of the consensus node in the second consensus node set for the second consensus period is determined according to the valid signature set.

The private key segment generation notification includes a private key segment generation notification $Z_a$ transmitted by the consensus node $G_a$; and a specific process of obtaining the first signature verification result $J_a$ may include: decrypting the notification signature $T_a$ by using the global public key associated with the second consensus node set, to obtain a first digital digest; acquiring a second digital digest of the private key segment generation notification $Z_a$, and comparing the first digital digest with the second digital digest; determining that the first signature verification result $J_a$ is the signature verification pass result when the first digital digest and the second digital digest are the same; and determining that the first signature verification result $J_a$ is the signature verification failure result when the first digital digest and the second digital digest are different.

A specific process of determining the consensus permission of the consensus node in the second consensus node set for the second consensus period according to the valid signature set may include: counting a total quantity of notification signatures in the valid signature set; determining a first quantity ratio between the total quantity of nodes and the total quantity of signatures, and comparing the first quantity ratio with a first quantity ratio threshold; determining, when the first quantity ratio is less than the first quantity ratio threshold, that the consensus node in the second consensus node set does not have a consensus permission for the second consensus period; and determining, when the first quantity ratio is greater than or equal to the first quantity ratio threshold, that the consensus node in the second consensus node set has a consensus permission for the second consensus period.

After receiving the private key segment generation notification, the consensus node in the first consensus node set verifies validity of the notification signature according to a new global public key (which is equivalent to the global public key associated with the second consensus period, and is not equivalent to the global public key associated with the first consensus period), and if it is invalid, deletes the notification signature, and if it is valid, caches the notification signature. After a sufficient quantity of private key segment generation notifications separately transmitted by consensus nodes in the second consensus node set are received, a blocking node in the first consensus node set performs aggregation processing on valid notification signatures by using a signature aggregation algorithm to obtain one aggregate signature, and packages the aggregate signature into a block that is being processed to notify another consensus node in the first consensus node set that a consensus node set in a next consensus period (that is, the second consensus node set) is ready. After the first consensus node set reaches consensus on the block, the first consensus node set may exit consensus, and the second consensus node set takes over a consensus permission.

Referring to FIG. 7 together, after obtaining the private key segment generation notification transmitted by any consensus node of the second consensus node set, any consensus node of the first consensus node set performs the following steps. For example, the blockchain node 70a in FIG. 7 is any consensus node in the first consensus node set, and the blockchain node 405c in FIG. 7 is any consensus node in the second consensus node set. The blockchain node 70a decrypts the notification signature 50i by using the global public key 50h (equivalent to the global public key 50h in FIG. 5) associated with the second consensus node set to obtain a first digital digest; may use a hash algorithm to acquire a second digital digest of the private key segment generation notification, and the blockchain node 70*a* compares the first digital digest with the second digital digest; if the first digital digest and the second digital digest are different, determines that a first signature verification result for the notification signature 50*i* is a signature verification failure result, and in this case, the blockchain node 70*a* deletes the notification signature 50*i*; and if the first digital digest and the second digital digest are the same, determines that the first signature verification result for the notification signature 50*i* is a signature verification pass result, and in this case, the blockchain node 70*a* adds the notification signature 50*i* to a valid signature set 70*b*.

Figure 8:
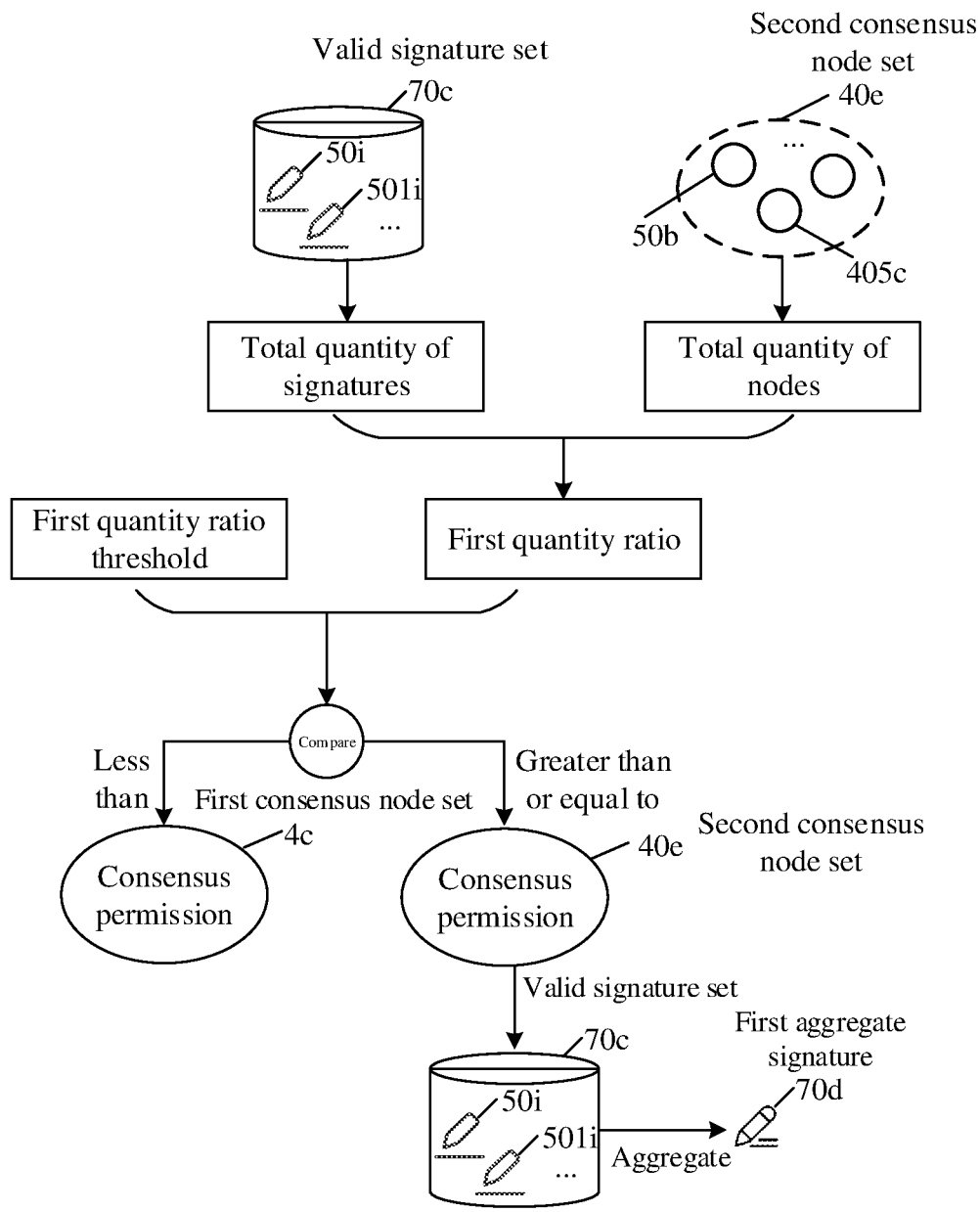
FIG. 8 is a schematic diagram of a scenario of blockchain-based data processing according to an embodiment of the present disclosure.

Further, referring to FIG. 8 together, FIG. 8 is a schematic diagram of a scenario of blockchain-based data processing according to an embodiment of the present disclosure. As shown in FIG. 8, a consensus node in a first consensus node set counts a total quantity of notification signatures in a valid signature set 70*c*, where the valid signature set 70*c* shown in FIG. 8 includes a notification signature 50*i*, . . . , and a notification signature 501*i*. The notification signature 50*i* may be a notification signature of a consensus node (equivalent to the blockchain node 405*c*) in a second consensus node set 40*e* (equivalent to the second consensus node set 40*e* in FIG. 5), and the notification signature 501*i* may be a notification signature of a consensus node (equivalent to the blockchain node 50*b*) in the second consensus node set 40*e*. The consensus node in the first consensus node set 4*c* determines a first quantity ratio between a total quantity of nodes and a total quantity of signatures. It may be understood that the total quantity of signatures is less than or equal to the total quantity of nodes, and therefore, the first quantity ratio is less than or equal to 1. The first quantity ratio is compared with a first quantity ratio threshold, and it is assumed that the first quantity ratio is 0.9. If the first quantity ratio threshold is equal to 0.95, it is determined that the first quantity ratio is less than the first quantity ratio threshold. Further, it may be determined that the consensus node in the second consensus node set 40*e* does not have a consensus permission for a second consensus period, that is, the consensus node in the first consensus node set still executes a consensus service. If the first quantity ratio threshold is equal to 0.85, and in this case, the first quantity ratio is greater than the first quantity ratio threshold, it may be determined that the consensus node in the second consensus node set has a consensus permission for the second consensus period.

In this embodiment of the present disclosure, when a consensus node in a consensus network is dynamically added or deleted, an aggregate signature distributed key system can be automatically updated, and the consensus service does not need to be stopped. In addition, in an aggregate signature method, a distributed key system is used, multi-party consensus nodes participate, and all consensus nodes cannot predict private key segments used for signatures, thereby preventing malicious behavior by a few nodes.

It may be learned from the foregoing that, by using the transition block height interval, in the present disclosure, when the first consensus node set is switched to the second consensus node set, it is not necessary to wait for the consensus node in the second consensus node set to generate a private key segment associated with the second consensus period, so that the consensus node in the second consensus node set can have the consensus permission more smoothly, and a case in which block consensus is suspended for a relatively long time during switching of the consensus node set can be avoided. Therefore, in the present disclosure, continuity and timeliness of the blockchain service can be improved.

In addition, the private key segment associated with the second consensus period in the present disclosure is associated with the set information corresponding to the second consensus node set, that is, the private key segment (associated with the set information corresponding to the first consensus node set) used for signing in the first consensus period is different from the private key segment used for signing in the second consensus period. Therefore, security of the blockchain service can be improved in the present disclosure.

Figure 9:
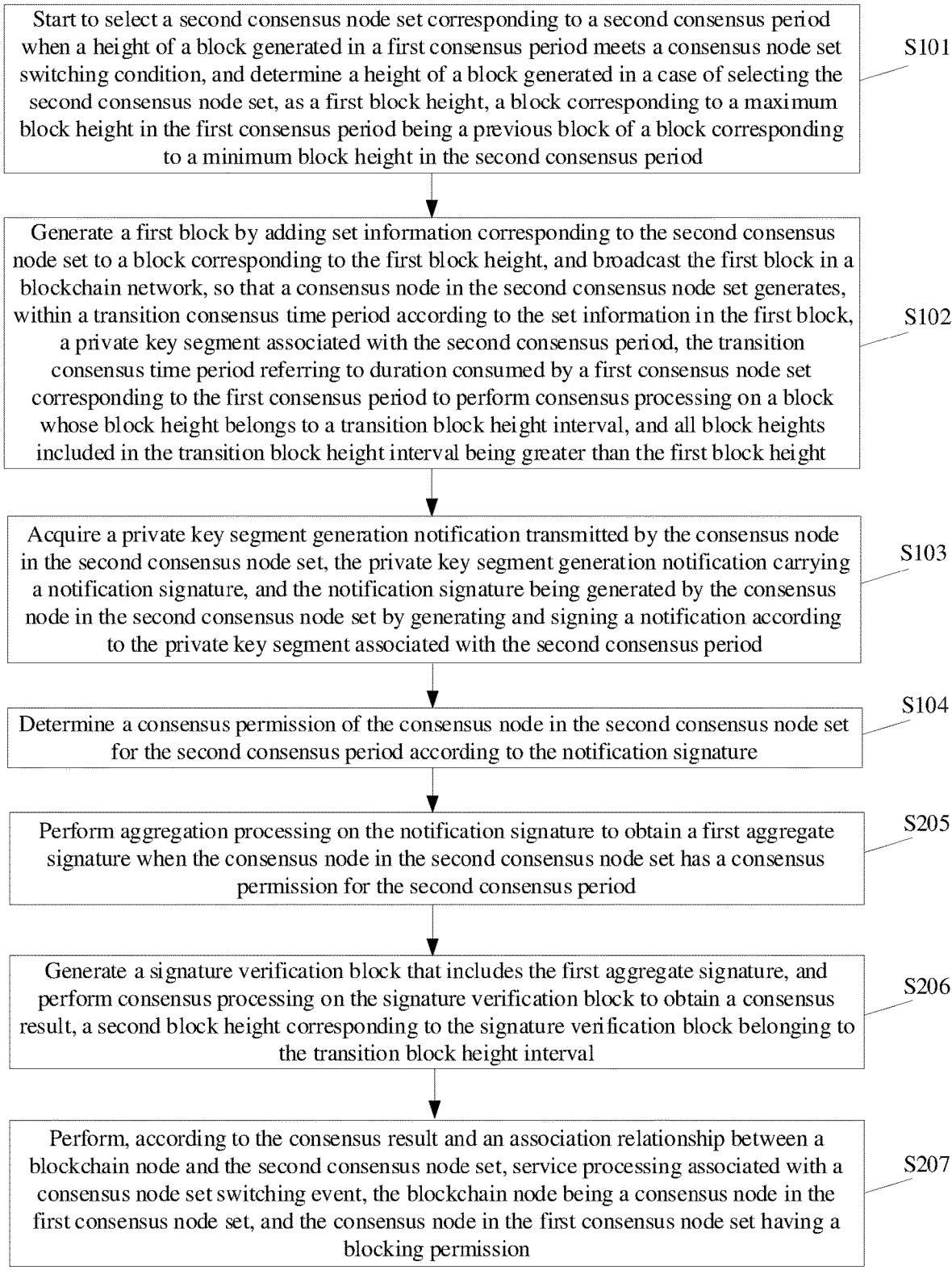
FIG. 9 is a schematic flowchart of a blockchain-based data processing method according to an embodiment of the present disclosure.

Further, referring to FIG. 9, FIG. 9 is a schematic flowchart of a blockchain-based data processing method according to an embodiment of the present disclosure. The blockchain-based data processing method may be performed by a computer device. The computer device may include any one consensus node in a first consensus node set, or may include any one consensus node in a second consensus node set, or may include any one consensus node in the first consensus node set and any one consensus node in the second consensus node set. As shown in FIG. 9, the blockchain-based data processing process further includes the following steps based on step S101 to step S104.

Step S205: Perform aggregation processing on the notification signature to obtain a first aggregate signature when the consensus node in the second consensus node set has a consensus permission for the second consensus period.

Specifically, after a sufficient quantity of private key segment generation notifications separately transmitted by consensus nodes in the second consensus node set are received, a blocking node in the first consensus node set performs aggregation processing on valid notification signatures by using a signature aggregation algorithm to obtain one aggregate signature. Referring to FIG. 8 again, when the first quantity ratio is equal to or greater than the first quantity ratio threshold, the consensus node in the first consensus node set may determine that the consensus node in the second consensus node set has the consensus permission for the second consensus period. In this case, the consensus node in the first consensus node set performs aggregation processing on notification signatures (including the notification signature 50*i* and the notification signature 501*i* shown in FIG. 8) in the valid signature set 70*c*, to obtain a first aggregate signature 70*d*. This embodiment of the present disclosure sets no limitation on an aggregate signature algorithm. The aggregate signature algorithm may be set according to an actual application scenario, and may include a BLS signature algorithm. The signature algorithm may implement signature aggregation and key aggregation, that is, multiple keys may be aggregated into one secret key, and the multiple signatures may be aggregated into one signature. The aggregate signature algorithm may further include a digital signature algorithm, such as a Schnorr signature algorithm.

Step S206: Generate a signature verification block that includes the first aggregate signature, and perform consensus processing on the signature verification block to obtain a consensus result, a second block height corresponding to the signature verification block belonging to the transition block height interval.

Specifically, the blocking node in the first consensus node set packages the first aggregate signature into the block being processed, and notifies another consensus node in the first consensus node set that the consensus node set (that is, the second consensus node set) for the next consensus period is ready. After the first consensus node set reaches consensus on the block, the first consensus node set may exit consensus, and the second consensus node set takes over a consensus permission.

Figure 10:
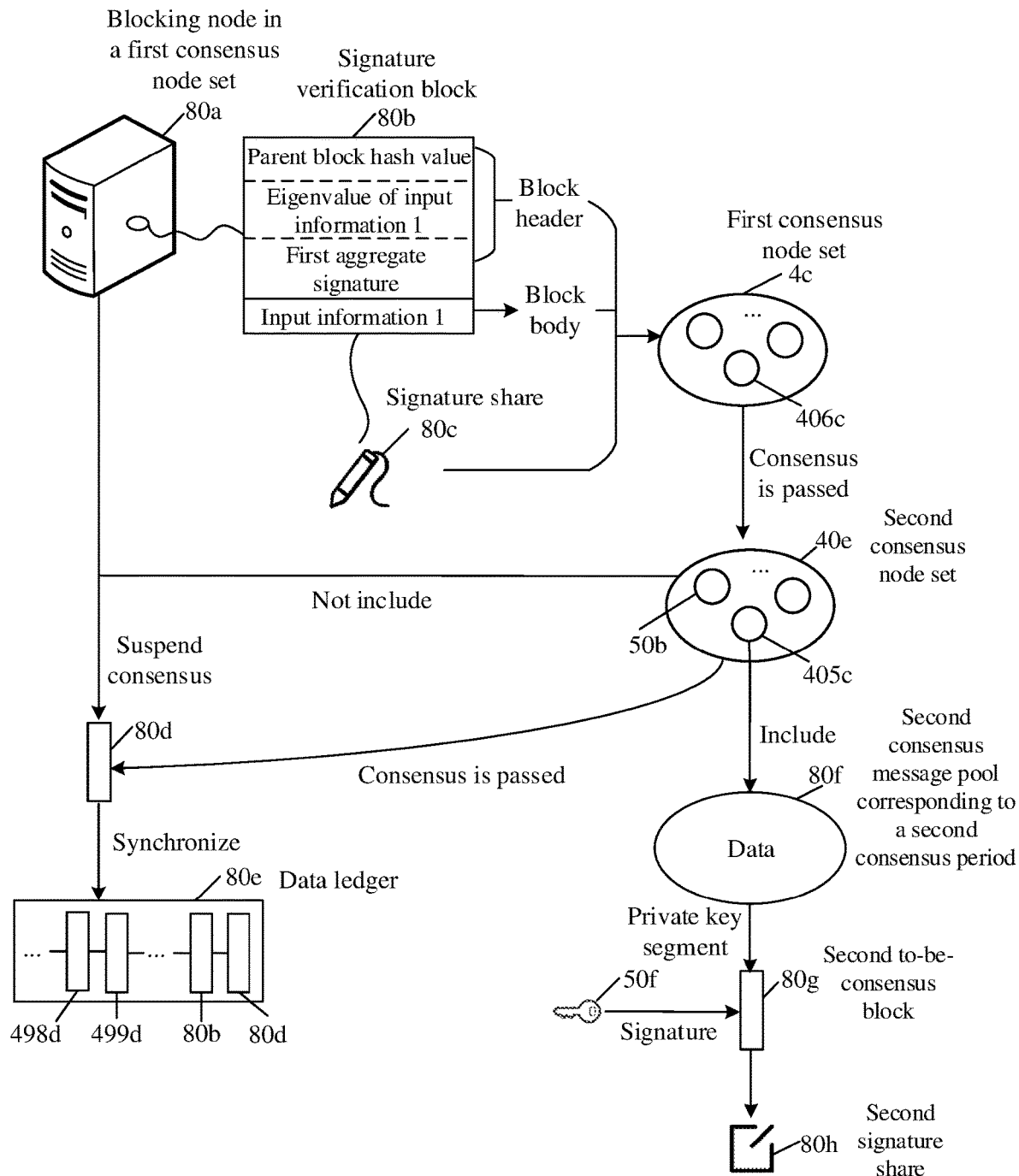
FIG. 10 is a schematic diagram of a scenario of blockchain-based data processing according to an embodiment of the present disclosure.

Referring to FIG. 10 together, FIG. 10 is a schematic diagram of a scenario of blockchain-based data processing according to an embodiment of the present disclosure. A blockchain node 80a in FIG. 10 is a blocking node in a first consensus node set 4c, and generates a signature verification block 80b that includes a first aggregate signature. The signature verification block 80b includes a block header and a block body, the block body may include input information 1 (equivalent to transaction data), and the block header may include data such as a parent block hash value, an eigenvalue of the input information 1 (equivalent to the eigenvalue of the input information 1 in FIG. 10), and the first aggregate signature. It may be understood that the parent block hash value in the signature verification block 80b is not equal to the parent block hash value in the block 499d (that is, the first block) in FIG. 5. According to the description of FIG. 5, it may be determined that the parent block hash value in the block 499d in FIG. 5 is a hash value for the block 98, and the parent block hash value in the signature verification block 80b is a hash value for a previous block of the signature verification block 80b. If the signature verification block 80b is the block 102, the previous block is the block 101.

The blockchain node 80a signs the signature verification block 80b according to its private key segment associated with the first consensus period, to obtain a signature share 80c belonging to the blockchain node 80a, and shares the signature verification block 80b that carries the signature share 80c in the consensus network. It may be understood that in this case, the consensus network includes the first consensus node set 4c. A consensus result of the consensus network for the signature verification block 80b is acquired. If the consensus result is a consensus failure result, the blockchain node 80a does not perform on-chain processing on the signature verification block 80b. If the consensus result is a consensus success result, the blockchain node 80a performs on-chain processing on the signature verification block 80b, which may specifically include the following step S207.

It may be understood that when consensus on the signature verification block 80b by the consensus network is passed, the blockchain node 80a may obtain an aggregate signature for the signature verification block 80b according to the signature share 80c and a signature share that is respectively corresponding to another consensus node in the first consensus node set 4c. When the signature verification block 80b is on-chain, the aggregate signature is carried.

Step S207: Perform, according to the consensus result and an association relationship between a blockchain node and the second consensus node set, service processing associated with a consensus node set switching event, the blockchain node being a consensus node in the first consensus node set, and the consensus node in the first consensus node set having a block-producing permission.

Specifically, when the consensus result is a consensus pass result, it is determined that a blockchain consensus node set is switched from the first consensus node set to the second consensus node set; the association relationship between the blockchain node and the second consensus node set is determined, and when the association relationship indicates that the blockchain node does not belong to the second consensus node set, the blockchain node exits from the blockchain consensus node set, and consensus processing on a block at the blockchain node in the second consensus period is suspended; and a block that passes consensus by the second consensus node set is synchronized to a data ledger.

Specifically, the private key segment associated with the second consensus period includes a second target private key segment; when the consensus result is a consensus pass result, it is determined that a blockchain consensus node set is switched from the first consensus node set to the second consensus node set; the association relationship between the blockchain node and the second consensus node set is determined, and when the association relationship indicates that the blockchain node belongs to the second consensus node set, a second consensus message pool corresponding to the second consensus period is acquired; a second to-be-consensus block is generated according to data in the second consensus message pool, and the second to-be-consensus block is signed by using the second target private key segment to obtain a second signature share; and on-chain processing is performed on the second to-be-consensus block that carries the second signature share, the second signature share indicating that the consensus node in the second consensus node set performs source validity verification on the second to-be-consensus block.

The second consensus node set includes a consensus node $G_b$, b is a positive integer, b is less than or equal to a total quantity of consensus nodes in the second consensus node set, and the private key segment associated with the second consensus period includes a private key segment $P_b$ corresponding to the consensus node $G_b$; and a specific process of performing on-chain processing on the second to-be-consensus block that carries the second signature share may include: broadcasting, in a consensus network, the second to-be-consensus block that carries the second signature share; acquiring a second signature share $F_b$ transmitted by the consensus node $G_b$, the second signature share $F_b$ being generated by the consensus node $G_b$ by signing a consensus result $S_b$ according to the private key segment $P_b$, and the consensus result $S_b$ being used for representing a consensus result of the consensus node $G_b$ for the second to-be-consensus block; verifying a signature of the second signature share $F_b$ by using the global public key associated with the second consensus node set, to obtain a second signature verification result $D_b$; and determining the second to-be-consensus block as a second block according to the second signature verification result $D_b$.

The second signature verification result $D_b$ includes a signature verification failure result or a signature verification pass result; and a specific process of determining the second to-be-consensus block as a second block according to the second signature verification result $D_b$ may include: deleting the second signature share $F_b$ when the second signature verification result $D_b$ is the signature verification failure result; storing the second signature share $F_b$ into a valid share set when the second signature verification result $D_b$ is the signature verification pass result; determining a total quantity of second signature shares in the valid share set, determining a second quantity ratio between the total quantity of nodes and the total quantity of shares, and comparing the second quantity ratio with a second quantity ratio threshold; and determining the second to-be-consensus block as the second block when the second quantity ratio is greater than or equal to the second quantity ratio threshold.

Further, the process includes: performing aggregation processing on the second signature shares in the valid share set to obtain a second aggregate signature, adding the second aggregate signature to the second block, and storing the second block that carries the second aggregate signature into a data ledger; acquiring a block synchronization request transmitted by a blockchain node for the second block, the blockchain network including the blockchain node; and returning, according to the block synchronization request, the second block that carries the second aggregate signature to the blockchain node, so that the blockchain node verifies the second aggregate signature according to the global public key to obtain a third signature verification result, and synchronizes the second block according to the third signature verification result.

With reference to the foregoing step S206 and FIG. 10, when the consensus result of the first consensus node set $4c$ for the signature verification block $80b$ is a consensus pass result, the blockchain node $80a$ determines that the blockchain consensus node set is switched from the first consensus node set $4c$ to the second consensus node set $40e$. Further, the association relationship between the blockchain node $80a$ and the second consensus node set $40e$ is determined. It may be understood that some blockchain nodes may exist in both the first consensus node set $4c$ and the second consensus node set $40e$. If the blockchain node $80a$ does not belong to the second consensus node set $40e$, that is, the second consensus node set $40e$ does not include the blockchain node $80a$, the blockchain node $80a$ exits from the blockchain consensus node set and suspends consensus processing on the block in the second consensus period, for example, the block $80d$. The signature verification block $80b$ is a previous block of the block $80d$. In this case, a block (including the block $80d$) consensus on which by the second consensus node set $40e$ is passed is synchronized to the data ledger $80e$, for example, the block $80d$ is synchronized to the data ledger $80e$. The data ledger $80e$ may include the block $498d$, and a block height corresponding to the block $498d$ (for example, the block height 98 in FIG. 4) meets a consensus node set switching condition in the first consensus period. The data ledger $80e$ may include the block $499d$, that is, the first block, and its block height is 99. The data ledger $80e$ may further include the signature verification block $80b$, and may include the block $80d$. It may be understood that, for a case where the blockchain node $80a$ belongs to the first consensus node set $4c$ and does not belong to the second consensus node set $40e$, the blockchain node $80a$ may participate in consensus processes of the block $498d$, the block $499$, . . . , and the signature verification block $80b$ according to the private key segment (also referred to as the private key segment of the blockchain node $80a$) associated with the first consensus period, but does not participate in the consensus process of the block $80d$.

If the blockchain node $80a$ belongs to the second consensus node set $40e$, that is, the second consensus node set $40e$ includes the blockchain node $80a$, the blockchain node $80a$ may have a consensus permission and a block-producing permission. Assuming that the blockchain node $80a$ is still used as a blocking node, a second consensus message pool $80f$ corresponding to the second consensus period may be acquired. Further, a second to-be-consensus block $80g$ may be generated according to data (which is equivalent to transaction data) in the second consensus message pool $80f$. It may be understood that the signature verification block $80b$ is a previous block of the second to-be-consensus block $80g$. In this embodiment of the present disclosure, assuming that the blockchain node $80a$ is equivalent to the blockchain node $405c$ in the second consensus node set $40e$, it may be learned from the foregoing description in FIG. 5 that the second target private key segment of the blockchain node $80a$ is equivalent to the private key segment $50f$. The blockchain node $80a$ signs the second to-be-consensus block $80g$ by using the second target private key segment (that is, the private key segment $50f$ in FIG. 10) to obtain a second signature share $80h$.

Figure 11:
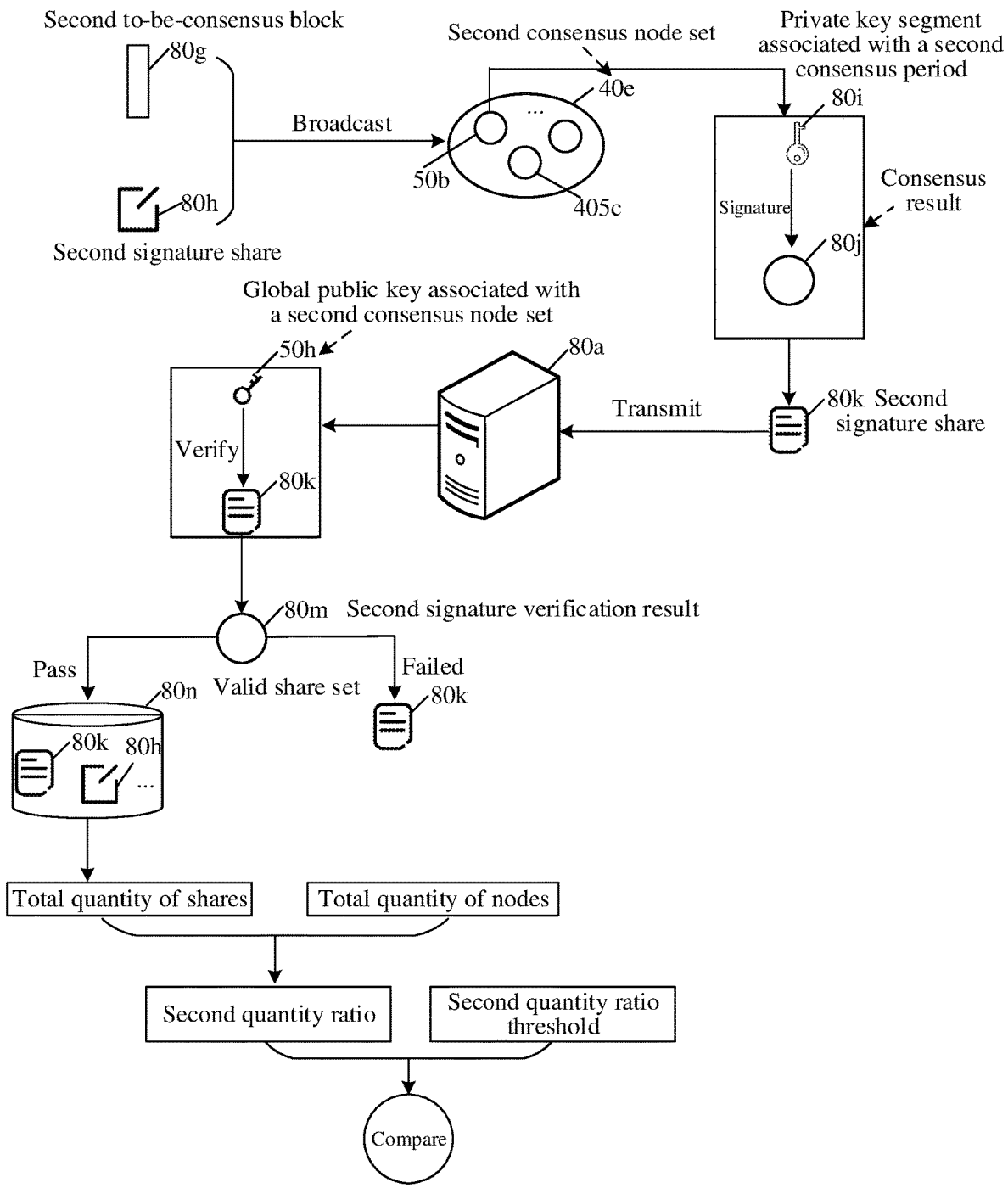
FIG. 11 is a schematic diagram of a scenario of blockchain-based data processing according to an embodiment of the present disclosure.

Further, referring to FIG. 11, FIG. 11 is a schematic diagram of a scenario of blockchain-based data processing according to an embodiment of the present disclosure. As shown in FIG. 11, a blockchain node $80a$ (which is a blocking node in the second consensus node set $40e$, assuming that it is equivalent to the blockchain node $405c$) broadcasts, in the consensus network, the second to-be-consensus block $80g$ that carries the second signature share $80h$. It may be understood that the consensus network herein includes the second consensus node set $40e$. The blockchain node $80a$ acquires a second signature share transmitted by the consensus node in the second consensus node set $40e$. As shown in FIG. 11, a second signature share $80k$ transmitted by a blockchain node $50b$ is acquired, where the second signature share $80k$ is generated by the blockchain node $50b$ by signing a consensus result $80j$ according to a private key segment $80i$ (associated with the second consensus period), and the consensus result $80j$ is used for representing a consensus result of the blockchain node $50b$ for the second consensus block $80g$. The blockchain node $80a$ performs verification on the second signature share $80k$ by using the global public key $50h$ associated with the second consensus node set, to obtain a second signature verification result $80m$. For a signature verification process of the second signature verification result, refer to the foregoing embodiment corresponding to FIG. 7 for the signature verification process of the notification signature $50i$. The two verification processes are consistent, and therefore details of signature verification are not described herein again.

Further, if the second signature verification result $80m$ is a signature verification failure result, the blockchain node $80a$ deletes the second signature share $80k$. If the second signature verification result $80m$ is a signature verification pass result, the second signature share $80m$ is stored in a valid share set $80n$. As shown in FIG. 11, the valid share set $80n$ includes the second signature share $80h$, . . . , and the second signature share $80k$. The blockchain node $80a$ determines a total quantity of second signature shares in the valid share set $80n$, determining a second quantity ratio between the total quantity of nodes and the total quantity of shares, and comparing the second quantity ratio with a second quantity ratio threshold; and determines the second to-be-consensus block $80g$ as the second block when the second quantity ratio is greater than or equal to the second quantity ratio threshold.

Figure 12:
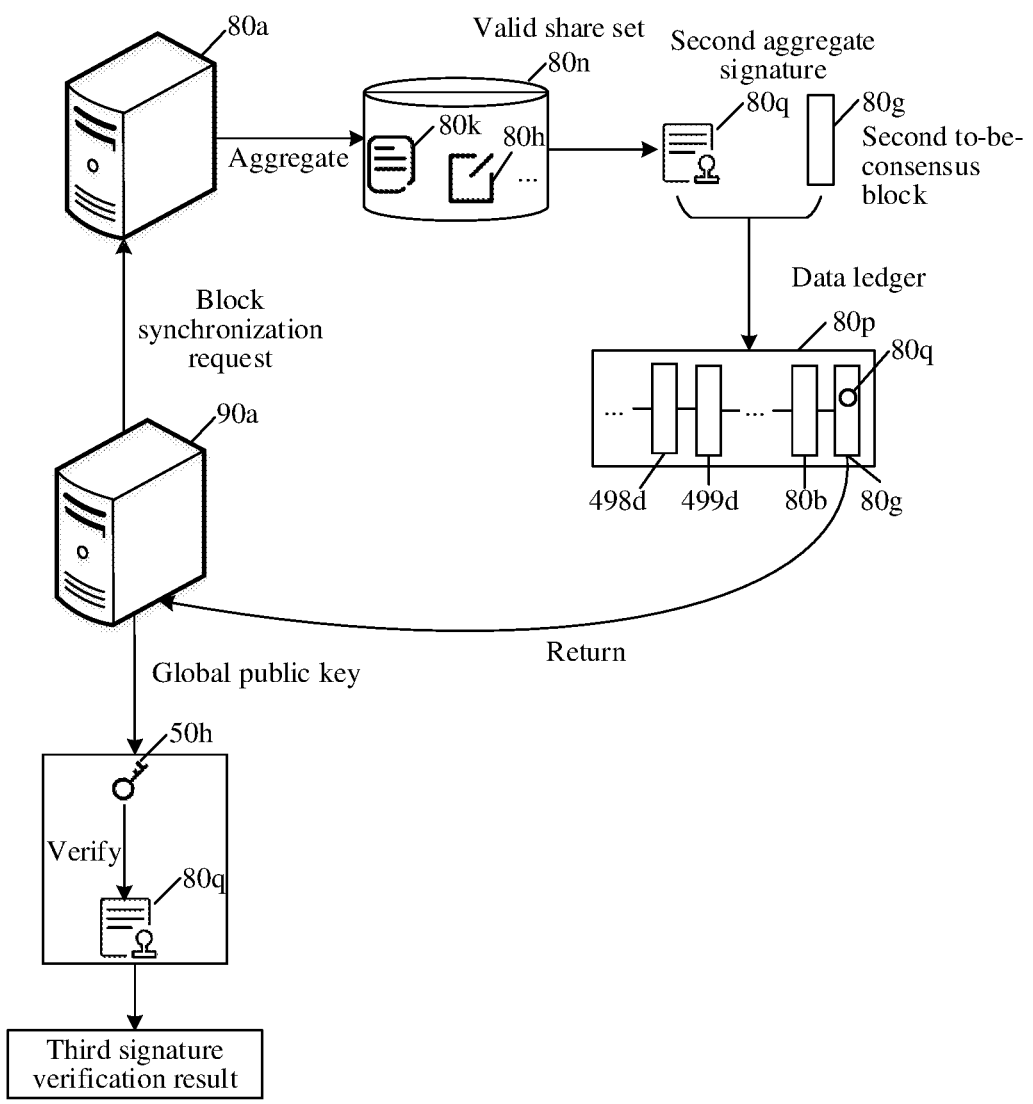
FIG. 12 is a schematic diagram of a scenario of blockchain-based data processing according to an embodiment of the present disclosure.

Further, referring to FIG. 12 together, FIG. 12 is a schematic diagram of a scenario of blockchain-based data processing according to an embodiment of the present disclosure. As shown in FIG. 12, according to a signature aggregation algorithm, a blockchain node $80a$ performs aggregation processing on second signature shares in the valid share set $80n$ to obtain a second aggregate signature $80q$. Subsequently, the second aggregate signature $80q$ is added to a second block (which may be equivalent to the second to-be-consensus block $80g$ in FIG. 12). The blockchain node $80a$ stores the second block carrying the second aggregate signature $80q$ into a data ledger $80p$. The data ledger $80p$ may include the block $498d$, and a block height corresponding to the block $498d$ (for example, the block height 98 in FIG. 4) meets a consensus node set switching condition in the first consensus period. The data ledger $80p$ may include the block $499d$, that is, the first block, and its block height is 99. The data ledger 80p may further include the signature verification block 80b, and may include the second block.

It may be understood that, for a case where the blockchain node 80a belongs to both the first consensus node set 4c and the second consensus node set 40e, the blockchain node 80a may participate in consensus processes of the block 498d, the block 499, . . . , and the signature verification block 80b according to the private key segment (also referred to as the private key segment of the blockchain node 80a) associated with the first consensus period, and may participate in the consensus process of the second block according to the private key segment associated with the second consensus period, such as the example private key segment 50f in FIG. 10.

Referring to FIG. 12, the blockchain node 80a acquires a block synchronization request transmitted by a blockchain node 90a for the second block (equivalent to the second to-be-consensus block 80g shown in the example in FIG. 12). It may be understood that the blockchain node 90a may be any blockchain node in the blockchain network. According to the block synchronization request, the blockchain node 80a returns the second block that carries the second aggregate signature 80q to the blockchain node 90a, so that the blockchain node 90a verifies the second aggregate signature 80q according to the global public key 50h to obtain a third signature verification result. When the third signature verification result is a signature verification pass result, the blockchain node 90a synchronizes the second block.

It may be understood that, for ease of understanding and description in this embodiment of the present disclosure, both the signature verification block 80b and the blocking node of the second block are set as blockchain nodes 80a. In actual application, blocking nodes respectively corresponding to two blocks may not be one consensus node.

In some embodiments, the second block height is compared with a maximum block height in the transition block height interval when the consensus result is a consensus pass result; service processing associated with the consensus node set switching event is performed according to the association relationship between the blockchain node and the second consensus node set when the second block height is equal to the maximum block height; a first consensus message pool corresponding to the first consensus period is acquired when the second block height is less than the maximum block height; a first to-be-consensus block is generated according to data in the first consensus message pool, and the first to-be-consensus block is signed by using a first target private key segment to obtain a first signature share, the first target private key segment being a private key segment associated with the first consensus period; and on-chain processing is performed on the first to-be-consensus block that carries the first signature share, the first signature share indicating that the consensus node in the first consensus node set performs source validity verification on the first to-be-consensus block.

The transition time period in the foregoing embodiment starts with determining the first block and ends with on-chaining of the signature verification block. In actual application, the transition time period may further be determined according to the first block and the transition block height interval. For a specific process, refer to descriptions in the embodiment corresponding to FIG. 2. Details are not described herein again. For service processing associated with the consensus node set switching event according to the association relationship with the second consensus node set, refer to the foregoing description in step S207, which is not described herein.

Figure 13:
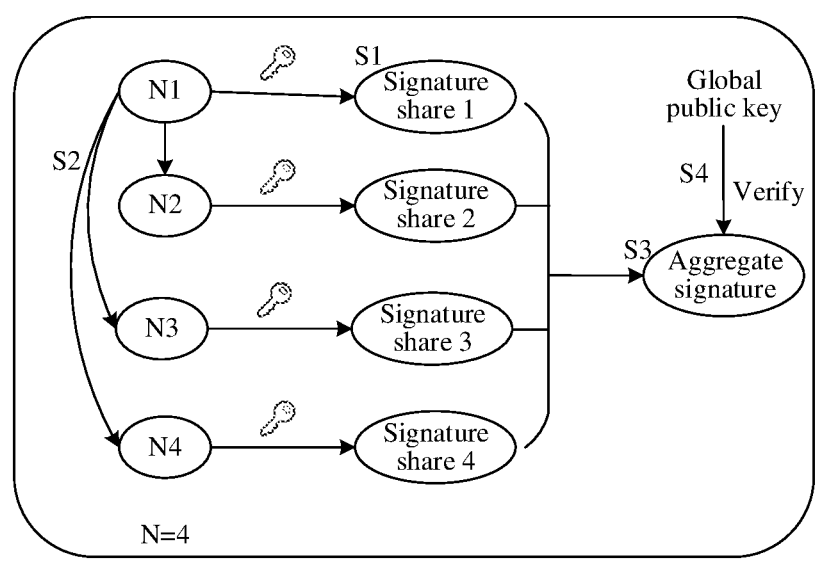
FIG. 13 is a schematic flowchart of a blockchain-based data processing method according to an embodiment of the present disclosure.

In conclusion, referring to FIG. 13, FIG. 13 is a schematic flowchart of a blockchain-based data processing method according to an embodiment of the present disclosure. As shown in FIG. 13, in this embodiment of the present disclosure, there are four consensus nodes in a consensus node set, which are respectively a consensus node N1, a consensus node N2, a consensus node N3, and a consensus node N4. The data processing method may include four steps S1 to S4, and functions of each step are described below.

S1. Each consensus node digitally signs a block by using a private key segment of the consensus node, to obtain a signature share.

It may be understood that private key segments respectively corresponding to all consensus nodes in the same consensus period are inconsistent, but are corresponding to the same global public key. Private key segments respectively corresponding to the same consensus node in different consensus periods are also inconsistent.

S2. Each consensus node broadcasts the signature share of the consensus node to another consensus node.

S3. After receiving the signature share from another consensus nodes, each consensus node performs validity verification on each signature share according to the global public key, discards an invalid signature share, and caches a valid signature share. After a quantity of collected valid signature shares meets a threshold signature quantity, the collected valid signature shares are used as inputs, and an aggregate signature algorithm is run to synthesize the valid signature shares to obtain a fixed-size aggregate signature. Each consensus node appends the generated aggregate signature to the block for writing to storage.

S4. When a blockchain node synchronizes the foregoing block data to a consensus node and verifies a block, it is only necessary to verify validity of the aggregate signature according to the global public key.

As described above, this embodiment of the present disclosure provides a consensus network aggregate signature method. In this method, an aggregate signature distributed key system can be automatically updated in a case in which a consensus network node is dynamically added or deleted, the consensus service does not need to be stopped, and a size of signature data generated in this method is fixed, thereby greatly improving availability and scalability of the blockchain. In addition, the method can effectively reduce storage space and network traffic transmission costs, and can further improve computation efficiency of signature verification.

Figure 14:
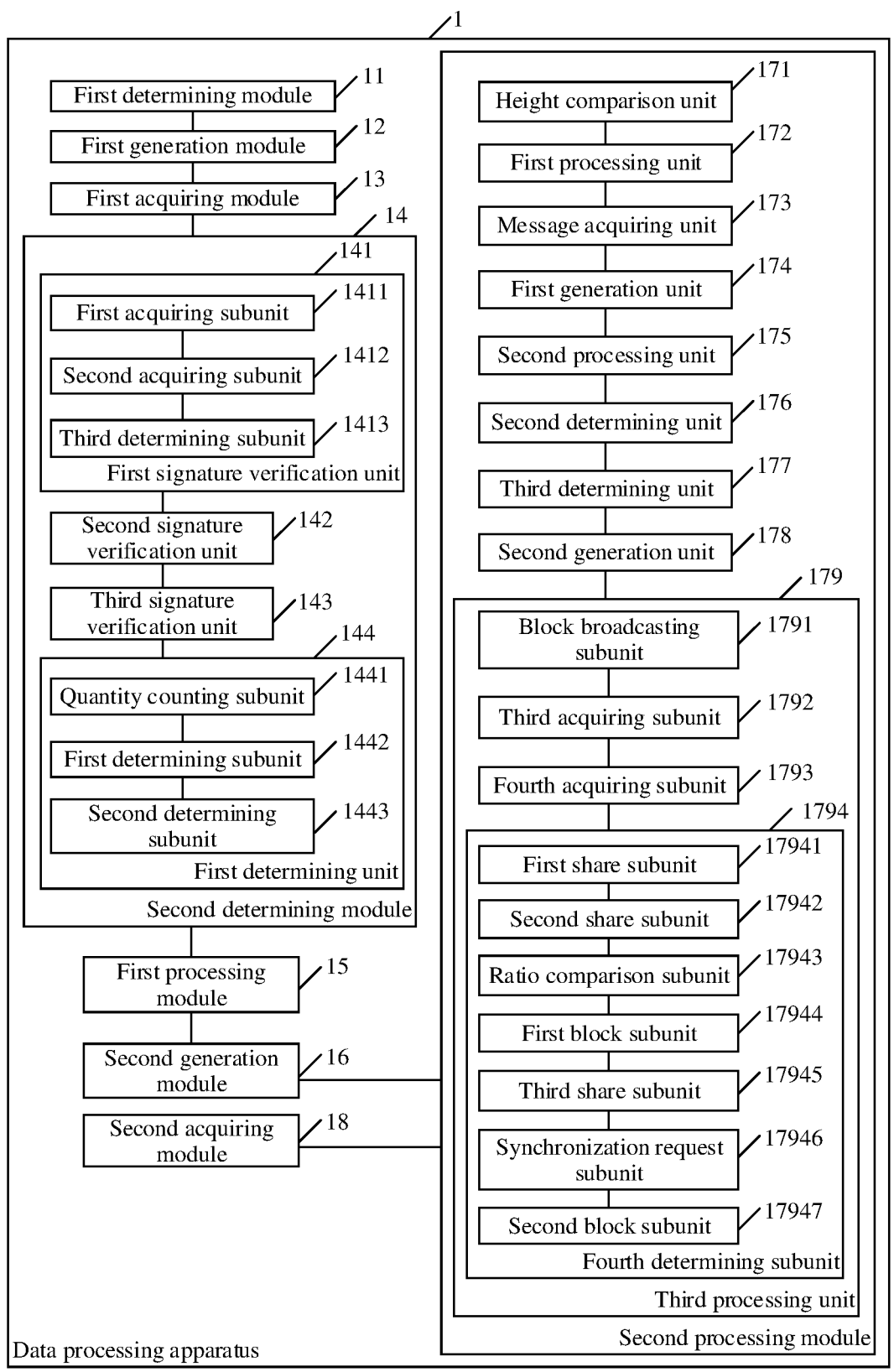
FIG. 14 is a schematic structural diagram of a blockchain-based data processing apparatus according to an embodiment of the present disclosure.

Further, referring to FIG. 14, FIG. 14 is a schematic structural diagram of a blockchain-based data processing apparatus according to an embodiment of the present disclosure. The blockchain-based data processing apparatus may be a computer program (including program code) running on a computer device, for example, the data processing apparatus based on a smart contract is application software. The apparatus may be configured to perform corresponding steps in the method provided in the embodiment of the present disclosure. As shown in FIG. 14, the data processing apparatus 1 may include: a first determining module 11, a first generation module 12, a first acquiring module 13, and a second determining module 14.

The first determining module 11 is configured to: start to select a second consensus node set corresponding to a second consensus period when a height of a block generated in a first consensus period meets a consensus node set switching condition, and determine a height of a block generated when selecting the second consensus node set, as a first block height, a block corresponding to a maximum block height in the first consensus period being a previous block of a block corresponding to a minimum block height in the second consensus period;

the first generation module 12 is configured to: generate a first block by adding set information corresponding to the second consensus node set to a block corresponding to the first block height, and broadcast the first block in a blockchain network, so that a consensus node in the second consensus node set generates, within a transition consensus time period according to the set information in the first block, a private key segment associated with the second consensus period, the transition consensus time period refers to duration consumed by a first consensus node set corresponding to the first consensus period to perform consensus processing on a block whose block height belongs to a transition block height interval, and all block heights included in the transition block height interval being greater than the first block height;

the first acquiring module 13 is configured to acquire a private key segment generation notification transmitted by the consensus node in the second consensus node set, the private key segment generation notification carrying a notification signature, and the notification signature being generated by the consensus node in the second consensus node set by generating and signing a notification according to the private key segment associated with the second consensus period; and the second determining module 14 is configured to determine a consensus permission of the consensus node in the second consensus node set for the second consensus period according to the notification signature.

For specific function implementations of the first determining module 11, the first generation module 12, the first acquiring module 13, and the second determining module 14, refer to step S101 to step S104 in the foregoing embodiment corresponding to FIG. 3. Details are not described herein again.

Referring to FIG. 14, the second consensus node set includes a consensus node $G_a$, a is a positive integer, and a is less than or equal to a total quantity of consensus nodes in the second consensus node set, and the notification signature includes a notification signature $T_a$ for the consensus node $G_a$; and the second determining module 14 may include: a first verification unit 141, a second verification unit 142, a third verification unit 143, and a first determining unit 144.

The first verification unit 141 is configured to perform verification on the notification signature $T_a$ by using a global public key associated with the second consensus node set, to obtain a first signature verification result $J_a$, the first signature verification result $J_a$ including a signature verification failure result or a signature verification pass result;

the second verification unit 142 is configured to delete the notification signature $T_a$ when the first signature verification result $J_a$ is the signature verification failure result;

the third verification unit 143 is configured to add the notification signature $T_a$ to a valid signature set when the first signature verification result $J_a$ is the signature verification pass result; and the first determining unit 144 is configured to determine the consensus permission of the consensus node in the second consensus node set for the second consensus period according to the valid signature set.

For specific function implementations of the first verification unit 141, the second verification unit 142, the third verification unit 143, and the first determining unit 144, refer to step S104 in the foregoing embodiment corresponding to FIG. 3. Details are not described herein again.

Referring to FIG. 14 again, the first determining unit 144 may include: a quantity counting subunit 1441, a first determining subunit 1442, and a second determining subunit 1443.

The quantity counting subunit 1441 is configured to count a total quantity of notification signatures in the valid signature set;

the first determining subunit 1442 is configured to determine a first quantity ratio between the total quantity of nodes and the total quantity of signatures, and compare the first quantity ratio with a first quantity ratio threshold;

the second determining subunit 1443 is configured to determine, when the first quantity ratio is less than the first quantity ratio threshold, that the consensus node in the second consensus node set does not have a consensus permission for the second consensus period; and the second determining subunit 1443 is further configured to determine, when the first quantity ratio is greater than or equal to the first quantity ratio threshold, that the consensus node in the second consensus node set has a consensus permission for the second consensus period.

For specific function implementations of the quantity counting subunit 1441, the first determining subunit 1442, and the second determining subunit 1443, refer to step S104 in the foregoing embodiment corresponding to FIG. 3. Details are not described herein again.

Referring to FIG. 14 again, the private key segment generation notification includes a private key segment generation notification Za transmitted by the consensus node Ga; and the first signature verification unit 141 may include: a first acquiring subunit 1411, a second acquiring subunit 1412, and a third determining subunit 1413.

The first acquiring subunit 1411 is configured to decrypt the notification signature Ta by using the global public key associated with the second consensus node set, to obtain a first digital digest;

the second acquiring subunit 1412 is configured to acquire a second digital digest of the private key segment generation notification Za, and compare the first digital digest with the second digital digest;

the third determining subunit 1413 is configured to determine that the first signature verification result Ja is the signature verification pass result when the first digital digest and the second digital digest are the same; and the third determining subunit 1413 is further configured to determine that the first signature verification result Ja is the signature verification failure result when the first digital digest and the second digital digest are different.

For specific function implementations of the first acquiring subunit 1411, the second acquiring subunit 1412, and the third determining subunit 1413, refer to step S104 in the embodiment corresponding to FIG. 3. Details are not described herein again.

Referring to FIG. 14 again, the data processing apparatus 1 may further include: a first processing module 15, a second generation module 16, and a second processing module 17.

The first processing module 15 is configured to: perform aggregation processing on the notification signature to obtain a first aggregate signature when the consensus node in the second consensus node set has a consensus permission for the second consensus period;

the second generation module 16 is configured to: generate a signature verification block that includes the first aggregate signature, and perform consensus processing on the signature verification block to obtain a consensus result, a second block height corresponding to the signature verification block belonging to the transition block height interval; and the second processing module 17 is configured to perform, according to the consensus result and an association relationship between a blockchain node and the second consensus node set, service processing associated with a consensus node set switching event, the blockchain node being a consensus node in the first consensus node set, and the consensus node in the first consensus node set having a block-producing permission.

For specific function implementations of the first processing module 15, the second generation module 16, and the second processing module 17, refer to step S205- and step S207 in the embodiment corresponding to FIG. 9. Details are not described herein again.

Referring to FIG. 14 again, the second processing module 17 may include: a height comparison unit 171, a first processing unit 172, a message acquiring unit 173, a first generation unit 174, and a second processing unit 175.

The height comparison unit 171 is configured to: compare the second block height with a maximum block height in the transition block height interval when the consensus result is a consensus pass result;

the first processing unit 172 is configured to: perform, according to the association relationship with the second consensus node set when the second block height is equal to the maximum block height, service processing associated with the consensus node set switching event;

the message acquiring unit 173 is configured to: acquire a first consensus message pool corresponding to the first consensus period when the second block height is less than the maximum block height;

the first generating unit 174 is configured to: generate a first to-be-consensus block according to data in the first consensus message pool, and sign the first to-be-consensus block by using a first target private key segment to obtain a first signature share, the first target private key segment being a private key segment associated with the first consensus period; and the second processing unit 175 is configured to perform on-chain processing on the first to-be-consensus block that carries the first signature share, the first signature share indicating that the consensus node in the first consensus node set performs source validity verification on the first to-be-consensus block.

For specific function implementations of the height comparison unit 171, the first processing unit 172, the message acquiring unit 173, the first generation unit 174, and the second processing unit 175, refer to step S207 in the foregoing embodiment corresponding to FIG. 9. Details are not described herein again.

Referring to FIG. 14 again, the second processing module 17 may include: a second determining unit 176 and a third determining unit 177.

The second determining unit 176 is configured to: determine, when the consensus result is a consensus pass result, that a blockchain consensus node set is switched from the first consensus node set to the second consensus node set; and the third determining unit 177 is configured to: determine the association relationship between the blockchain node and the second consensus node set, and when the association relationship indicates that the blockchain node does not belong to the second consensus node set, exit from the blockchain consensus node set, and suspend consensus processing on a block in the second consensus period; and the third determining unit 177 is further configured to synchronize a block that passes consensus by the second consensus node set to a data ledger.

For specific function implementations of the second determining unit 176 and the third determining unit 177, refer to step S207 in the embodiment corresponding to FIG. 9. Details are not described herein again.

Referring to FIG. 14 again, the private key segment associated with the second consensus period includes a second target private key segment;

the second processing module may include: a second generation unit 178 and a third processing unit 179.

The second determining unit 176 is configured to: determine, when the consensus result is a consensus pass result, that a blockchain consensus node set is switched from the first consensus node set to the second consensus node set; and the third determining unit 177 is further configured to: determine the association relationship between the blockchain node and the second consensus node set, and when the association relationship indicates that the blockchain node belongs to the second consensus node set, acquire a second consensus message pool corresponding to the second consensus period;

the second generation unit 178 is configured to: generate a second to-be-consensus block according to data in the second consensus message pool, and sign the second to-be-consensus block by using the second target private key segment to obtain a second signature share; and the third processing unit 179 is configured to perform on-chain processing on the second to-be-consensus block that carries the second signature share, the second signature share indicating that the consensus node in the second consensus node set performs source validity verification on the second to-be-consensus block.

For specific function implementations of the second determining unit 176, the third determining unit 177, the second generation unit 178, and the third processing unit 179, refer to step S207 in the foregoing embodiment corresponding to FIG. 9. Details are not described herein again.

Referring to FIG. 14 again, the second consensus node set includes a consensus node Gb, b is a positive integer, b is less than or equal to a total quantity of consensus nodes in the second consensus node set, and the private key segment associated with the second consensus period includes a private key segment Pb corresponding to the consensus node Gb; and the third processing unit 179 may include: a block broadcasting subunit 1791, a third acquiring subunit 1792, a fourth acquiring subunit 1793, and a fourth determining subunit 1794.

The block broadcasting subunit 1791 is configured to broadcast, in a consensus network, the second to-be-consensus block that carries the second signature share;

the third acquiring subunit 1792 is configured to acquire a second signature share Fb transmitted by the consensus node Gb, the second signature share Fb being generated by the consensus node Gb by signing a consensus result Sb according to the private key segment Pb, and the consensus result Sb being used for representing a consensus result of the consensus node Gb for the second to-be-consensus block;

the fourth acquiring subunit 1793 is configured to verify a signature of the second signature share Fb by using the global public key associated with the second consensus node set, to obtain a second signature verification result Db; and the fourth determining subunit 1794 is configured to determine the second to-be-consensus block as a second block according to the second signature verification result Db.

For specific function implementations of the block broadcasting subunit 1791, the third acquiring subunit 1792, the fourth acquiring subunit 1793, and the fourth determining subunit 1794, refer to step S207 in the foregoing embodiment corresponding to FIG. 9. Details are not described herein again.

Referring to FIG. 14 again, the second signature verification result Db includes a signature verification failure result or a signature verification pass result; and the fourth determining subunit 1794 may include: a first share subunit 17941, a second share subunit 17942, a ratio comparison subunit 17943, and a first block subunit 17944.

The first share subunit 17941 is configured to delete the second signature share Fb when the second signature verification result Db is the signature verification failure result;

the second share subunit 17942 is configured to store the second signature share Fb into a valid share set when the second signature verification result Db is the signature verification pass result;

the ratio comparison subunit 17943 is configured to: determine a total quantity of second signature shares in the valid share set, determine a second quantity ratio between the total quantity of nodes and the total quantity of shares, and compare the second quantity ratio with a second quantity ratio threshold; and the first block subunit 17944 is configured to determine the second to-be-consensus block as the second block when the second quantity ratio is greater than or equal to the second quantity ratio threshold.

For specific function implementations of the first share subunit 17941, the second share subunit 17942, the ratio comparison subunit 17943, and the first block subunit 17944, refer to step S207 in the foregoing embodiment corresponding to FIG. 9. Details are not described herein again.

Referring to FIG. 14 again, the fourth determining subunit 1794 may further include: a third share subunit 17945, a synchronization request subunit 17946, and a second block subunit 17947.

The third share subunit 17945 is configured to: perform aggregation processing on the second signature shares in the valid share set to obtain a second aggregate signature, add the second aggregate signature to the second block, and store the second block that carries the second aggregate signature into a data ledger;

the synchronization request subunit 17946 is configured to acquire a block synchronization request transmitted by a blockchain node for the second block, the blockchain network including the blockchain node; and the second block subunit 17947 is configured to return, according to the block synchronization request, the second block that carries the second aggregate signature to the blockchain node, so that the blockchain node verifies the second aggregate signature according to the global public key to obtain a third signature verification result, and synchronizes the second block according to the third signature verification result.

For specific function implementations of the third share subunit 17945, the synchronization request subunit 17946, and the second block subunit 17947, refer to step S207 in the foregoing embodiment corresponding to FIG. 9. Details are not described herein again.

Referring to FIG. 14 again, the data processing apparatus 1 may further include: a second acquiring module 18.

The second acquiring module 18 is configured to: acquire the set information in the first block when the consensus node belongs to the second consensus node set, and generate, by using a distributed key component, a secret integer associated with the set information;

the second generation module 16 is further configured to generate a target local public key according to the secret integer; generate at least two secret shares according to the secret integer, a total quantity of the at least two secret shares being the same as the total quantity of consensus nodes in the second consensus node set, the consensus node in the second consensus node set including a consensus node Gc, c being a positive integer, c being less than or equal to the total quantity of nodes, and the at least two secret shares including a secret share Mc;

the second acquiring module 18 is further configured to: transmit the target local public key and the secret share Mc to the consensus node Gc, and acquire a local public key Uc and a secret share Ec that are transmitted by the consensus node Gc, both the local public key Uc and the secret share Ec being associated with a secret integer corresponding to the consensus node Gc;

the second acquiring module 18 is further configured to: perform validity verification on the secret share Ec, and broadcasting a validity verification result to the consensus node in the second consensus node set; and the second generation module 16 is further configured to generate a second target private key segment according to the secret share Ec and the secret share Mc; and generate, according to the target local public key and the local public key Uc, a global public key associated with the second consensus node set.

For specific function implementations of the second generation module 16 and the second acquiring module 18, refer to step S102 in the foregoing embodiment corresponding to FIG. 3. Details are not described herein again.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory).

Likewise, a processor (or processors and memory) can be used to implement one or more modules. Moreover, each module can be part of an overall module that includes the functionalities of the module.

Figure 15:
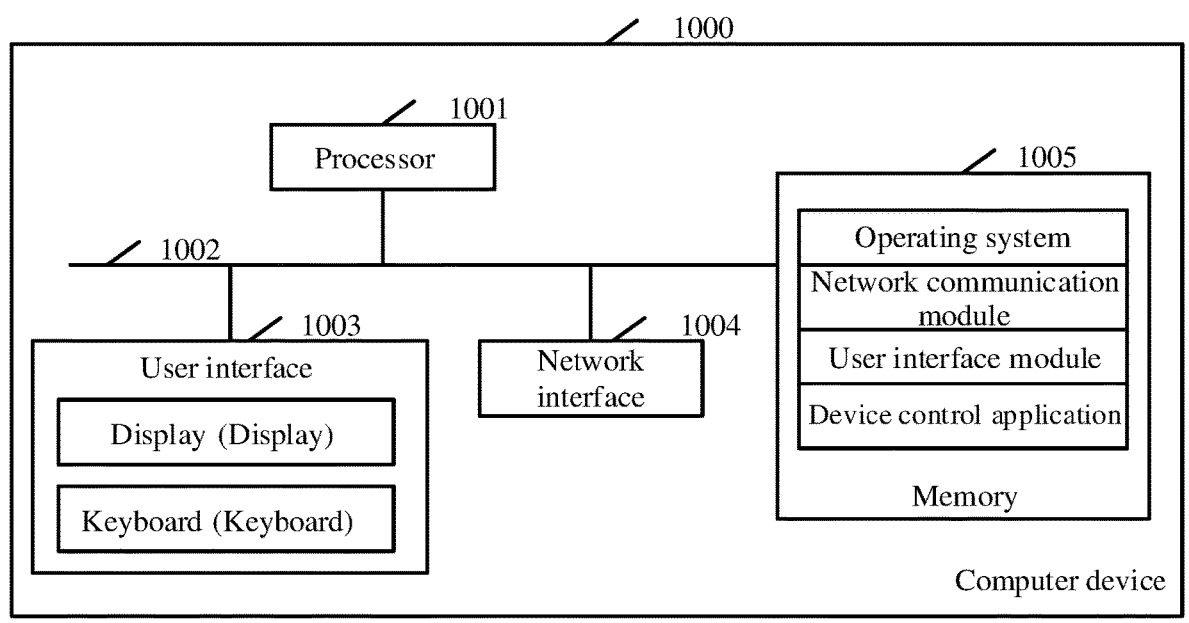
FIG. 15 is a schematic structural diagram of a computer device according to an embodiment of the present disclosure.

Further, referring to FIG. 15, FIG. 15 is a schematic structural diagram of a computer device according to an embodiment of the present disclosure. As shown in FIG. 15, the computer device 1000 may be the computer device in the foregoing embodiment corresponding to FIG. 3, and the computer device 1000 may include: at least one processor 1001, for example, a CPU, at least one network interface 1004, a user interface 1003, a memory 1005, and at least one communication bus 1002. The communication bus 1002 is configured to implement connection and communication between these components. The user interface 1003 may include a display and a keyboard, and the network interface 1004 may include a standard wired interface and a wireless interface (such as a Wi-Fi interface). The memory 1005 may be a high-speed RAM memory, or may be a non-volatile memory, for example, at least one magnetic disk memory.

In the computer device 1000 shown in FIG. 15, the network interface 1004 may provide a network communication function. The user interface 1003 is mainly configured to provide an input interface for a user. The processor 1001 may be configured to invoke the device-control application program stored in the memory 1005, so as to implement description of the blockchain-based data processing method in the foregoing embodiments corresponding to FIG. 3, FIG. 6, FIG. 9, and FIG. 13, or may execute the description of the blockchain-based data processing apparatus 1 in the foregoing embodiment corresponding to FIG. 14. Details are not described herein again. In addition, the description of beneficial effects of the same method are not described herein again.

An embodiment of the present disclosure further provides a computer-readable storage medium. The computer-readable storage medium stores a computer program. The computer program includes program instructions. When being executed by a processor, the program instructions implement the blockchain-based data processing method provided in steps in FIG. 3, FIG. 6, FIG. 9, and FIG. 13. For details, refer to the foregoing implementations provided in steps in FIG. 3, FIG. 6, FIG. 9, and FIG. 13. Details are not described herein again. In addition, the description of beneficial effects of the same method are not described herein again.

The foregoing computer-readable storage medium may be the blockchain-based data processing apparatus provided in any one of the foregoing embodiments or an internal storage unit of the foregoing computer device, such as a hard disk or a memory of the computer device. The computer-readable storage medium may also be an external storage device of the computer device, for example, a plug type hard disk, a smart media card (SMC), a secure digital (SD) card, and a flash card that are configured on the computer device.

An embodiment of the present disclosure provides a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, so that the computer device may perform the foregoing description of the blockchain-based data processing method in the embodiments corresponding to FIG. 3, FIG. 6, FIG. 9, and FIG. 13. Details are not described herein again.

The terms "first" and "second" in the specification, claims, and accompanying drawings of the embodiments of the present disclosure are used for distinguishing between different objects, and are not used for describing a specific sequence. In addition, the term "include" and any variant thereof are intended to cover a non-exclusive inclusion. For example, a process, method, apparatus, product, or device that includes a series of steps or units is not limited to the listed steps or modules; and instead, may further include a step or module that is not listed, or may further include another step or unit that is intrinsic to the process, method, apparatus, product, or device.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions.

The method and the related apparatus provided in the embodiments of the present disclosure are described with reference to a flowchart and/or a schematic structural diagram of the method provided in the embodiments of the present disclosure. Specifically, each process and/or block of the method flowchart and/or the schematic structural diagram of the method may be implemented by a computer program instruction, and a combination of the process and/or block in the flowchart and/or block diagram.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A blockchain-based data processing method, performed by a computer device of a node in a blockchain network and comprising:
  initiating a selection of a second consensus node set when a height of a block generated in a first consensus period meets a consensus node set switching condition, and determining a height of a first block generated when the selection of the second consensus node set is completed, as a first block height, wherein the first consensus period corresponds to a first consensus node set that participates in consensus processing, and a block having a maximum block height among blocks generated in the first consensus period is generated prior to a block having a minimum block height among blocks generated in a second consensus period corresponding to the second consensus node set;
  adding set information corresponding to the second consensus node set to the first block having the first block height, and broadcasting the first block in the blockchain network to cause each of consensus nodes in the second consensus node set to generate, within a transition consensus time period and according to the set information in the first block, a private key segment associated with the second consensus period, wherein the transition consensus time period is a time duration spent by the first consensus node set to complete performing the consensus processing on transition blocks having block heights in a transition height range, and the block height of each transition block is greater than the first block height;

acquiring, during the transition consensus time period, private key segment generation notifications transmitted by the consensus nodes in the second consensus node set, wherein each of the private key segment generation notifications carries a notification signature, and the notification signature is generated by one of the consensus nodes in the second consensus node set by generating and signing a notification according to the private key segment associated with the second consensus period; and determining whether a consensus permission has reached for the consensus nodes in the second consensus node set according to the notification signatures, wherein: the consensus processing of the transition blocks is performed by the first consensus node set after completion of the selection of the second consensus node set and during the transition consensus time period, and the consensus processing of a subsequently generated block is performed by the second consensus node set during the second consensus period after the consensus permission of the consensus nodes in the second consensus node set is reached.

2. The method according to claim 1, wherein the second consensus node set comprises a consensus node $G_a$, and a is a positive integer, and a is less than or equal to a total quantity of consensus nodes in the second consensus node set, and the notification signature-comprises a notification signature $T_a$ for the consensus node $G_a$; and the determining whether the consensus permission has reached for the consensus nodes in the second consensus node set according to the notification signatures comprises:

for the consensus node $G_a$ in the second consensus node set:

performing verification on the notification signature $T_a$ by using a global public key associated with the second consensus node set, to obtain a first signature verification result $J_a$, the first signature verification result $J_a$ comprising a signature verification failure result or a signature verification pass result;

deleting the notification signature $T_a$ when the first signature verification result $J_a$ is the signature verification failure result; and adding the notification signature $T_a$ to a valid signature set when the first signature verification result $J_a$ is the signature verification pass result; and determining whether the consensus permission has reached for the consensus nodes in the second consensus node set according to the valid signature set.

3. The method according to claim 2, wherein the determining whether the consensus permission has reached for the consensus nodes in the second consensus node set according to the valid signature set comprises:

counting a total quantity of the notification signatures in the valid signature set;

calculating a first quantity ratio between the total quantity of the consensus nodes in the second consensus node set and the total quantity of the notification signatures in the valid signature set, and comparing the first quantity ratio with a first quantity ratio threshold;

when the first quantity ratio is less than the first quantity ratio threshold, determining the consensus permission has not reached for the consensus nodes in the second consensus node set; and when the first quantity ratio is greater than or equal to the first quantity ratio threshold, determining the consensus permission has reached for the consensus nodes in the second consensus node set.

4. The method according to claim 2, wherein the private key segment generation notification comprises a private key segment generation notification $Z_a$ transmitted by the consensus node $G_a$; and the performing verification on the notification signature $T_a$ by using a global public key associated with the second consensus node set, to obtain a first signature verification result $J_a$ comprises:

decrypting the notification signature $T_a$ by using the global public key associated with the second consensus node set, to obtain a first digital digest;

acquiring a second digital digest of the private key segment generation notification $Z_a$, and comparing the first digital digest with the second digital digest;

determining that the first signature verification result $J_a$ is the signature verification pass result when the first digital digest and the second digital digest are the same; and determining that the first signature verification result $J_a$ is the signature verification failure result when the first digital digest and the second digital digest are different.

5. The method according to claim 1, further comprising:

performing aggregation processing on the notification signature to obtain a first aggregate signature when the consensus permission has reached for the consensus nodes in the second consensus node set;

generating a signature verification block that comprises the first aggregate signature, and performing consensus processing on the signature verification block to obtain a consensus result, wherein a second block height of the signature verification block is within the height range of the transition blocks; and performing, according to the consensus result and an association relationship between a blockchain node and the second consensus node set, service processing associated with a consensus node set switching event, the blockchain node being one of consensus nodes in the first consensus node set, and the consensus nodes in the first consensus node set having a block-producing permission.

6. The method according to claim 5, wherein, the consensus result is a consensus pass result, and the performing, according to the consensus result and an association relationship between a blockchain node and the second consensus node set, service processing associated with a consensus node set switching event comprises:

comparing the second block height with a maximum block height in the height range of the transition blocks;

performing, according to the association relationship between the blockchain node and the second consensus node set when the second block height equals the maximum block height, service processing associated with the consensus node set switching event; and when the second block height is less than the maximum block height, acquiring a first consensus message pool corresponding to the first consensus period;

generating a first to-be-consensus block according to data in the first consensus message pool, and signing the first to-be-consensus block by using a first target private key segment to obtain a first signature share, the first target private key segment being a private key segment associated with the first consensus period; and performing on-chain processing on the first to-be-consensus block that carries the first signature share, the first signature share indicating that the consensus nodes in the first consensus node set perform source validity verification on the first to-be-consensus block.

7. The method according to claim 5, wherein, the consensus result is a consensus pass result, and the performing, according to the consensus result and an association relationship between a blockchain node and the second consensus node set, service processing associated with a consensus node set switching event comprises:
  switching a current blockchain consensus node set from the first consensus node set to the second consensus node set;
  determining the association relationship between the blockchain node and the second consensus node set, and when the association relationship indicates that the blockchain node does not belong to the second consensus node set, exiting the blockchain node from the current blockchain consensus node set, and suspending consensus processing on a block at the blockchain node in the second consensus period; and
  synchronizing a block that passes consensus by the second consensus node set to a data ledger.

8. The method according to claim 5, wherein, the consensus result is a consensus pass result, the private key segment associated with the second consensus period comprises a second target private key segment; and
  the performing, according to the consensus result and an association relationship between a blockchain node and the second consensus node set, service processing associated with a consensus node set switching event comprises:
  determining that a blockchain consensus node set is switched from the first consensus node set to the second consensus node set;
  determining the association relationship between the blockchain node and the second consensus node set, and when the association relationship indicates that the blockchain node belongs to the second consensus node set, acquiring a second consensus message pool corresponding to the second consensus period;
  generating a second to-be-consensus block according to data in the second consensus message pool, and signing the second to-be-consensus block by using the second target private key segment to obtain a second signature share; and
  performing on-chain processing on the second to-be-consensus block that carries the second signature share, the second signature share indicating that the consensus nodes in the second consensus node set perform source validity verification on the second to-be-consensus block.

9. The method according to claim 8, wherein the second consensus node set comprises a consensus node $G_b$, b is a positive integer, b is less than or equal to a total quantity of consensus nodes in the second consensus node set, and the private key segment associated with the second consensus period comprises a private key segment $P_b$ corresponding to the consensus node $G_b$; and
  the performing on-chain processing on the second to-be-consensus block that carries the second signature share comprises:
  broadcasting, in a consensus network, the second to-be-consensus block that carries the second signature share;
  acquiring a second signature share $F_b$ transmitted by the consensus node $G_b$, the second signature share $F_b$ being generated by the consensus node $G_b$ by signing a consensus result $S_b$ according to the private key segment $P_b$, and the consensus result $S_b$ being used for representing a consensus result of the consensus node $G_b$ for the second to-be-consensus block;
  verifying a signature of the second signature share $F_b$ by using the global public key associated with the second consensus node set, to obtain a second signature verification result $D_b$; and
  determining the second to-be-consensus block as a second block according to the second signature verification result $D_b$.

10. The method according to claim 9, wherein the second signature verification result $D_b$ comprises a signature verification failure result or a signature verification pass result; and
  the determining the second to-be-consensus block as a second block according to the second signature verification result $D_b$ comprises:
  deleting the second signature share $F_b$ when the second signature verification result $D_b$ is the signature verification failure result;
  storing the second signature share $F_b$ into a valid share set when the second signature verification result $D_b$ is the signature verification pass result;
  determining a total quantity of second signature shares in the valid share set, determining a second quantity ratio between the total quantity of the consensus nodes in the second consensus node set and the total quantity of the second signature shares, and comparing the second quantity ratio with a second quantity ratio threshold; and
  determining the second to-be-consensus block as the second block when the second quantity ratio is greater than or equal to the second quantity ratio threshold.

11. The method according to claim 10, further comprising:
  performing aggregation processing on the second signature shares in the valid share set to obtain a second aggregate signature, adding the second aggregate signature to the second block, and storing the second block that carries the second aggregate signature into a data ledger;
  acquiring a block synchronization request transmitted by a blockchain node for the second block, the blockchain network comprising the blockchain node; and
  returning, according to the block synchronization request, the second block that carries the second aggregate signature to the blockchain node, so that the blockchain node verifies the second aggregate signature according to the global public key to obtain a third signature verification result, and synchronizes the second block according to the third signature verification result.

12. The method according to claim 1, further comprising:
  acquiring the set information in the first block when the consensus node belongs to the second consensus node set, and generating, by using a distributed key component, a secret integer associated with the set information;
  generating a target local public key according to the secret integer;
  generating at least two secret shares according to the secret integer, a total quantity of the at least two secret shares being the same as the total quantity of consensus nodes in the second consensus node set, the consensus nodes in the second consensus node set comprising a consensus node $G_c$, c being a positive integer, c being less than or equal to the total quantity of nodes, and the at least two secret shares comprising a secret share $M_c$;

transmitting the target local public key and the secret share $M_c$ to the consensus node $G_c$, and acquiring a local public key $U_c$ and a secret share $E_c$ that are transmitted by the consensus node $G_c$, both the local public key $U_c$ and the secret share $E_c$ being associated with a secret integer corresponding to the consensus node $G_c$;

performing validity verification on the secret share $E_c$, and broadcasting a validity verification result to the consensus nodes in the second consensus node set;

generating a second target private key segment according to the secret share $E_c$ and the secret share $M_c$; and generating, according to the target local public key and the local public key $U_c$, a global public key associated with the second consensus node set.

13. A blockchain-based data processing apparatus, comprising: a memory, and a processor coupled to the memory, the processor being configured to:

initiating a selection of a second consensus node set when a height of a block generated in a first consensus period meets a consensus node set switching condition, and determine a height of a first block generated when the selection of the second consensus node set is completed, as a first block height, wherein the first consensus period corresponds to a first consensus node set that participates in consensus processing, and a block having a maximum block height among blocks generated in the first consensus period is generated prior to a block having a minimum block height among blocks generated in a second consensus period corresponding to the second consensus node set;

adding set information corresponding to the second consensus node set to the first block having the first block height, and broadcast the first block in the blockchain network to cause each of consensus nodes in the second consensus node set to generate, within a transition consensus time period and according to the set information in the first block, a private key segment associated with the second consensus period, wherein the transition consensus time period is a time duration spent by the first consensus node set to complete performing the consensus processing on transition blocks having block heights in a transition height range, and the block height of each transition block is greater than the first block height;

acquire, during the transition consensus time period, private key segment generation notifications transmitted by the consensus nodes in the second consensus node set, wherein each of the private key segment generation notifications carries a notification signature, and the notification signature is generated by one of the consensus nodes in the second consensus node set by generating and signing a notification according to the private key segment associated with the second consensus period; and determine whether a consensus permission has reached for the consensus nodes in the second consensus node set according to the notification signatures, wherein: the consensus processing of the transition blocks is performed by the first consensus node set after completion of the selection of the second consensus node set and during the transition consensus time period, and the consensus processing of a subsequently generated block is performed by the second consensus node set during the second consensus period after the consensus permission of the consensus nodes in the second consensus node set is reached.

14. The apparatus according to claim 13, wherein the second consensus node set comprises a consensus node Ga, a is a positive integer, and a is less than or equal to a total quantity of consensus nodes in the second consensus node set, and the notification signature comprises a notification signature Ta for the consensus node Ga; and the processor is further configured to:
for the consensus node $G_a$ in the second consensus node set:
perform verification on the notification signature Ta by using a global public key associated with the second consensus node set, to obtain a first signature verification result Ja, the first signature verification result Ja comprising a signature verification failure result or a signature verification pass result;
delete the notification signature Ta when the first signature verification result Ja is the signature verification failure result;
add the notification signature Ta to a valid signature set when the first signature verification result Ja is the signature verification pass result; and
determine whether the consensus permission has reached for the consensus nodes in the second consensus node set according to the valid signature set.

15. The apparatus according to claim 14, wherein the processor is further configured to:
count a total quantity of the notification signatures in the valid signature set;
calculate a first quantity ratio between the total quantity of the consensus nodes in the second consensus node set and the total quantity of the notification signatures in the valid signature set, and compare the first quantity ratio with a first quantity ratio threshold;
when the first quantity ratio is less than the first quantity ratio threshold, determine the consensus permission has not reached for the consensus nodes in the second consensus node set; and
when the first quantity ratio is greater than or equal to the first quantity ratio threshold, determine the consensus permission has reached for the consensus nodes in the second consensus node set.

16. The apparatus according to claim 13, wherein the processor is further configured to:
perform aggregation processing on the notification signature to obtain a first aggregate signature when the consensus permission has reached for the consensus nodes in the second consensus node set;
generate a signature verification block that comprises the first aggregate signature, and perform consensus processing on the signature verification block to obtain a consensus result, wherein a second block height of the signature verification block is within the height range of the transition blocks; and
perform, according to the consensus result and an association relationship between a blockchain node and the second consensus node set, service processing associated with a consensus node set switching event, the blockchain node being one of consensus nodes in the first consensus node set, and the consensus node in the first consensus node set having a block-producing permission.

17. The apparatus according to claim 16, wherein, the consensus result is a consensus pass result, and the processor is further configured to:

compare the second block height with a maximum block height in the height range of the transition blocks;

perform, according to the association relationship between the blockchain node and the second consensus node set when the second block height is equal to the maximum block height, service processing associated with the consensus node set switching event; and when the second block height is less than the maximum block height, acquire a first consensus message pool corresponding to the first consensus period;

generate a first to-be-consensus block according to data in the first consensus message pool, and sign the first to-be-consensus block by using a first target private key segment to obtain a first signature share, the first target private key segment being a private key segment associated with the first consensus period; and perform on-chain processing on the first to-be-consensus block that carries the first signature share, the first signature share indicating that the consensus nodes in the first consensus node set perform source validity verification on the first to-be-consensus block.

18. The apparatus according to claim 15, wherein, the consensus result is a consensus pass result, and the processor is further configured to:

switch a blockchain consensus node set from the first consensus node set to the second consensus node set; and determine the association relationship between the blockchain node and the second consensus node set, and when the association relationship indicates that the blockchain node does not belong to the second consensus node set, exit from the blockchain consensus node set, and suspend consensus processing on a block in the second consensus period; and synchronize a block that passes consensus by the second consensus node set to a data ledger.

19. The apparatus according to claim 13, wherein the processor is further configured to:

acquire the set information in the first block when the consensus node belongs to the second consensus node set, and generate, by using a distributed key component, a secret integer associated with the set information; and generate a target local public key according to the secret integer; generate at least two secret shares according to the secret integer, a total quantity of the at least two secret shares being the same as the total quantity of consensus nodes in the second consensus node set, the consensus node in the second consensus node set comprising a consensus node Gc, c being a positive integer, c being less than or equal to the total quantity of nodes, and the at least two secret shares comprising a secret share Mc;

transmit the target local public key and the secret share Mc to the consensus node Gc, and acquire a local public key Uc and a secret share Ec that are transmitted by the consensus node Gc, both the local public key Uc and the secret share Ec being associated with a secret integer corresponding to the consensus node Gc; and perform validity verification on the secret share Ec, and broadcast a validity verification result to the consensus nodes in the second consensus node set; and generate a second target private key segment according to the secret share Ec and the secret share Mc; and generate, according to the target local public key and the local public key Uc, a global public key associated with the second consensus node set.

20. A non-transitory computer-readable storage medium, the computer-readable storage medium storing a computer program, and the computer program being loaded and executed by a processor of a node in a blockchain network to perform:

initiating a selection of a second consensus node set when a height of a block generated in a first consensus period meets a consensus node set switching condition, and determining a height of a first block generated when the selection of the second consensus node set is completed, as a first block height, wherein the first consensus period corresponds to a first consensus node set that participates in consensus processing, and a block having a maximum block height among blocks generated in the first consensus period is generated prior to a block having a minimum block height among blocks generated in a second consensus period corresponding to the second consensus node set;

adding set information corresponding to the second consensus node set to the first block having the first block height, and broadcasting the first block in the blockchain network to cause each of consensus nodes in the second consensus node set to generate, within a transition consensus time period and according to the set information in the first block, a private key segment associated with the second consensus period, wherein the transition consensus time period is a time duration spent by the first consensus node set to complete performing the consensus processing on transition blocks having block heights in a transition height range, and the block height of each transition block is greater than the first block height;

acquiring, during the transition consensus time period, private key segment generation notifications transmitted by the consensus nodes in the second consensus node set, wherein each of the private key segment generation notifications carries a notification signature, and the notification signature is generated by one of the consensus nodes in the second consensus node set by generating and signing a notification according to the private key segment associated with the second consensus period; and determining whether a consensus permission has reached for the consensus nodes in the second consensus node set according to the notification signatures, wherein: the consensus processing of the transition blocks is performed by the first consensus node set after completion of the selection of the second consensus node set and during the transition consensus time period, and the consensus processing of a subsequently generated block is performed by the second consensus node set during the second consensus period after the consensus permission of the consensus nodes in the second consensus node set is reached.

* * * * *